United States Patent
Uetake et al.

(10) Patent No.: US 9,873,365 B2
(45) Date of Patent: *Jan. 23, 2018

(54) TRANSPORT MACHINE

(71) Applicant: Komatsu Ltd., Tokyo (JP)

(72) Inventors: Masaaki Uetake, Kawasaki (JP);
Yuichi Kodama, Hiratsuka (JP);
Kazunari Kawai, Kawasaki (JP);
Shinichi Terada, Kawasaki (JP)

(73) Assignee: Komatsu Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/024,190

(22) PCT Filed: Sep. 30, 2014

(86) PCT No.: PCT/JP2014/076209
§ 371 (c)(1),
(2) Date: Mar. 24, 2016

(87) PCT Pub. No.: WO2015/046609
PCT Pub. Date: Apr. 2, 2015

(65) Prior Publication Data
US 2016/0229326 A1    Aug. 11, 2016

(30) Foreign Application Priority Data

Sep. 30, 2013  (JP) ................. 2013-205913

(51) Int. Cl.
*B60P 1/32*    (2006.01)
*E21C 41/16*   (2006.01)
(Continued)

(52) U.S. Cl.
CPC ............... *B60P 1/32* (2013.01); *B65G 67/04* (2013.01); *B65G 67/24* (2013.01); *E02F 3/20* (2013.01);
(Continued)

(58) Field of Classification Search
CPC ........... B60P 1/6436; B60P 1/32; B60P 11/30; E21F 13/025; E21F 13/063; E21F 13/065; E02F 9/2029
(Continued)

(56) References Cited

U.S. PATENT DOCUMENTS 2,477,066 A * 7/1949 Kuert ................. B60P 1/32
                                              2/171.02
3,054,160 A * 9/1962 Letourneau ............ B60P 3/00
                                              296/26.11
(Continued)

FOREIGN PATENT DOCUMENTS

CH    629446 A5   4/1982
DE    587100 C    11/1933
(Continued)

OTHER PUBLICATIONS

Examination Report dated Jan. 17, 2017, issued for the corresponding Australian patent application No. 2014329319.
(Continued)

*Primary Examiner* — Anna Momper
*Assistant Examiner* — Mark Hageman
(74) *Attorney, Agent, or Firm* — Locke Lord LLP

(57) ABSTRACT

A transport machine is provided with a traveling device, a vehicle body, a vessel, a support device and a load detection device. At least a portion of the vehicle body is arranged above the traveling device. The vessel is provided on the vehicle body. The support device includes a slide mechanism that moves the vessel in a lateral direction with respect to the vehicle body, the lateral direction intersecting with a traveling direction of the traveling device when the transport machine travels straight. The load detection device detects a
(Continued)

state of a load on the vessel. The slide mechanism is controlled based on a result of detection by the load detection device.

13 Claims, 15 Drawing Sheets

(51) Int. Cl.
  *B65G 67/24* (2006.01)
  *E21F 13/02* (2006.01)
  *B65G 67/04* (2006.01)
  *E02F 3/20* (2006.01)
  *E02F 7/02* (2006.01)
  *E02F 9/20* (2006.01)
  *B60P 1/28* (2006.01)

(52) U.S. Cl.
  CPC .............. *E02F 7/026* (2013.01); *E02F 9/205* (2013.01); *E21C 41/16* (2013.01); *E21F 13/025* (2013.01); *B60P 1/28* (2013.01)

(58) Field of Classification Search
  USPC .......................................................... 298/13
  See application file for complete search history.

(56) References Cited

U.S. PATENT DOCUMENTS

| | | | | | |
|---|---|---|---|---|---|
| 3,809,262 | A * | 5/1974 | Galis | ..................... | E21F 13/025 414/501 |
| 3,826,387 | A * | 7/1974 | Galis | ........................ | B60P 1/00 37/304 |
| 4,208,160 | A * | 6/1980 | Lovgren | ............... | B60P 1/6436 414/347 |
| 4,256,434 | A * | 3/1981 | Stodt | ..................... | A01D 90/08 100/218 |
| 4,465,155 | A * | 8/1984 | Collins | .................... | B62D 1/28 180/169 |
| 4,537,554 | A * | 8/1985 | Collins, Jr. | ............ | B65G 67/20 414/288 |
| 4,576,107 | A * | 3/1986 | Brasher | ................. | E21F 13/025 116/227 |
| 7,899,599 | B2 | 3/2011 | Makela et al. | | |
| 9,052,716 | B2 * | 6/2015 | Tanaka | .................. | E02F 9/2033 |
| 2007/0110551 | A1 | 5/2007 | Barry | | |
| 2012/0290178 | A1 | 11/2012 | Suzuki et al. | | |
| 2015/0101519 | A1 * | 4/2015 | Blackwell | ........... | A01B 59/002 111/200 |

FOREIGN PATENT DOCUMENTS

| | | |
|---|---|---|
| FR | 2151147 A5 | 4/1973 |
| GB | 191016009 A | 3/1911 |
| JP | 51-71509 U | 6/1976 |
| JP | 5-93974 U | 12/1993 |
| JP | 07-144570 A | 6/1995 |
| JP | 2013-001362 A | 1/2013 |
| WO | WO-2013/058247 A1 | 4/2013 |

OTHER PUBLICATIONS

International Search Report dated Dec. 22, 2014, issued for PCT/JP2014/076209.
Supplementary European Search Report dated Jun. 9, 2017, issued for the European patent application No. 14848515.4.

* cited by examiner

TRANSPORT MACHINE

FIELD

The present invention relates to a transport machine.

BACKGROUND

As a mining method in a mine, a surface mining and an underground mining are known. In the surface mining, mining is performed from a surface of the earth. In the underground mining, mining is performed from underground. In recent years, there are many cases where underground mining is employed, in view of its reduced burden on the environment, and increasing depth of locations of ore deposits. Patent Literature 1 discloses an exemplary technique regarding a transport machine operating inside an underground mine.

CITATION LIST

Patent Literature

Patent Literature 1: U.S. Pat. No. 7,899,599

SUMMARY

Technical Problem

The transport machine used for underground mining operates in an environment different from an environment of surface mining. For example, the transport machine is required to travel in a tunnel. Therefore, the transport machine used for underground mining needs to have a form suitable for the environment of underground mining.

The present invention is intended to provide a transport machine capable of performing operation smoothly even on a site of underground mining

Solution to Problem

According to the present invention, a transport machine comprises: a traveling device; a vehicle body arranged above the traveling device; a vessel provided on the vehicle body; a support device including a slide mechanism configured to move the vessel in a lateral direction with respect to the vehicle body, the lateral direction intersecting with a traveling direction of the traveling device when the transport machine travels straight; and a load detection device configure to detect a state of a load on the vessel, wherein the slide mechanism is controlled based on a result of detection by the load detection device.

In the present invention, in one or both of cases where the load is loaded onto the vessel and the load is discharged from the vessel, the slide mechanism can be configured to move the vessel such that at least a portion of the vessel is arranged outside the vehicle body.

In the present invention, the slide mechanism can be capable of moving the vessel such that at least a portion of the vessel is arranged on each of one and other sides of the vehicle body with respect to the lateral direction.

In the present invention, the load detection device can be configured to detect a form of a load of the vessel, and based on a result of detection by the load detection device, the vessel can be configured to move in the lateral direction by the slide mechanism such that a position of the vessel is adjusted with respect to a loading machine that loads a load onto the vessel.

In the present invention, wherein the load detection device can be configured to detect a weight of the load of the vessel, and based on a result of detection by the load detection device, the vessel can be configured to move in the lateral direction by the slide mechanism such that a position of the vessel is adjusted with respect to a loading machine that loads a load onto the vessel.

In the present invention, the transport machine can comprise: a loading machine detection device configured to detect a loading machine that loads a load onto the vessel, wherein, based on a result of detection by the loading machine detection device, the vessel can be configured to move in the lateral direction by the slide mechanism such that a position of the vessel is adjusted with respect to the loading machine.

In the present invention, the slide mechanism can be configured to reciprocate the vessel with respect to the lateral direction.

In the present invention, the slide mechanism can be configured to reciprocate the vessel in one or both of a loading operation period in which a load is loaded on the vessel and a period after the loading operation period.

In the present invention, the transport machine can comprise: the load detection device configured to detect a state of a load of the vessel, and wherein an amplitude of reciprocation of the vessel can be determined based on a result of detection by the load detection device.

In the present invention, the transport machine can comprise: a form detection device configured to detect a form of a load of the vessel; and a weight detection device configured to detect a weight of the vessel, wherein whether to reciprocate the vessel can be determined based on a result of detection by the form detection device and a result of detection by the weight detection device.

In the present invention, the support device can include a side dump mechanism configured to discharge a load of the vessel to the lateral direction intersecting with the traveling direction.

In the present invention, the traveling device can include a front wheel and a rear wheel, the vehicle body can include a recess arranged between the front wheel and the rear wheel, and at least a portion of the vessel can be arranged at the recess.

In the present invention, the vehicle body can include a front section, at least a portion of the front section being arranged above the front wheel, the vehicle body can include a rear section, at least a portion of the rear section being arranged above the rear wheel, the recess can be arranged between the front section and the rear section, and an upper surface of the vessel can be arranged below an upper surface of the front section and an upper surface of the rear section.

Advantageous Effects of Invention

According to the present invention, it is possible to provide a transport machine capable of performing operation smoothly even on a site of underground mining.

DESCRIPTION OF EMBODIMENTS

Hereinafter, embodiments according to the present invention will be described with reference to the drawings, although the present invention is not limited to the embodiments. In the following, positional relationships between individual portions will be described based on an assumption that a predetermined direction on a horizontal surface is defined as an $X_0$-axis direction, a direction orthogonal to an X-axis direction on the horizontal surface is defined as a $Y_0$-axis direction, a direction orthogonal to each of the $X_0$-axis direction and the $Y_0$-axis direction is defined as a $Z_0$-axis direction.

<Summary of Mining Site>

Figure 1:
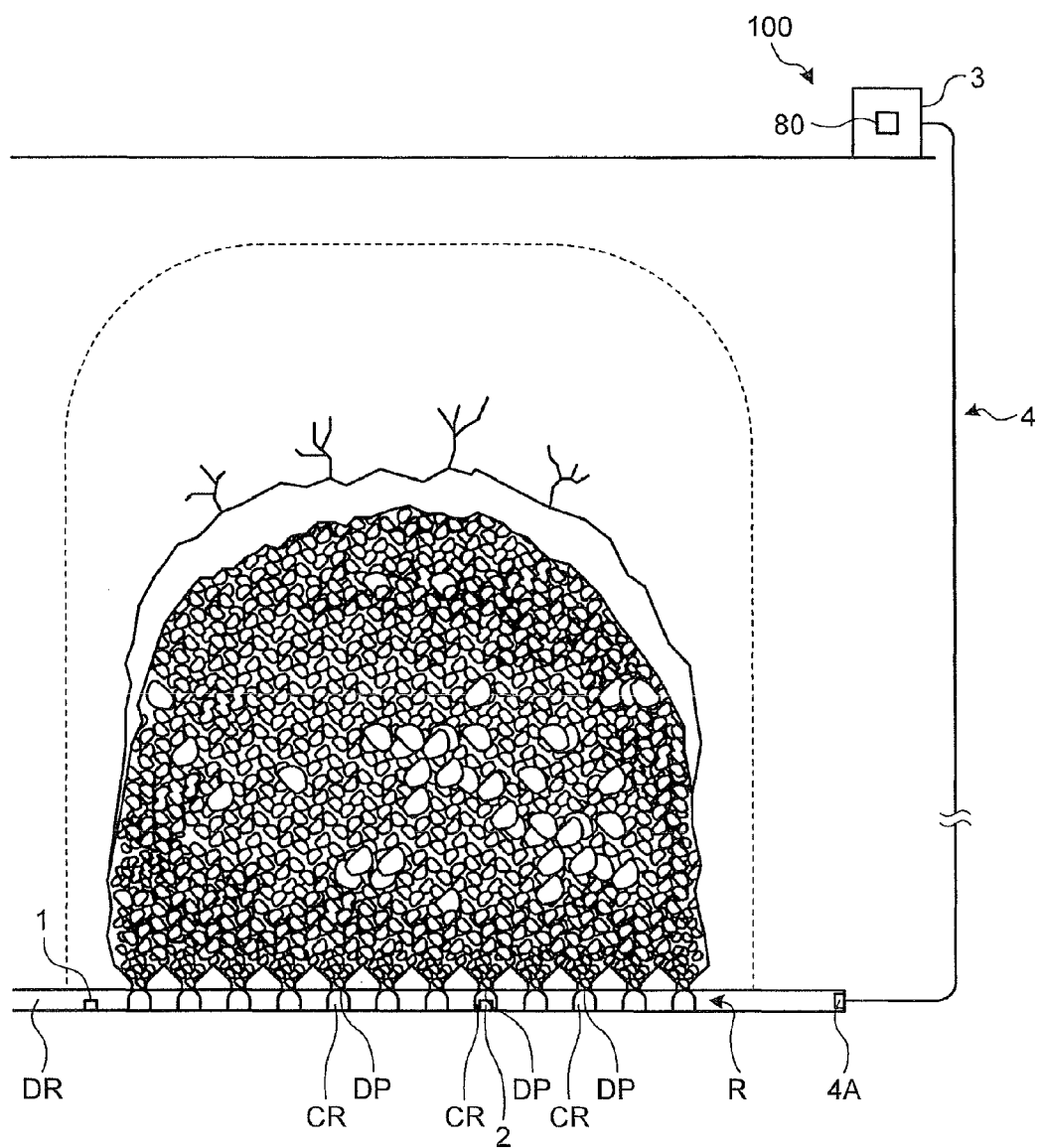
FIG. 1 is a schematic diagram illustrating an exemplary mining site according to the present embodiment.

FIG. 1 is a schematic diagram illustrating an exemplary site on which a transport machine 1 and a loading machine 2 according to the present embodiment operate. The transport machine 1 and the loading machine 2 are used in underground mining, namely, the mining of an ore from underground. The transport machine 1 is a type of mining machine for transporting a load in a tunnel R. The loading machine 2 is a type of mining machine for loading the load onto the transport machine 1. In the present embodiment, mining is performed with a block caving method. The block caving method is a method of mining in which there are provided, at a lower portion of an ore body (vein), an ore extraction portion DP and the tunnel R for transporting the extracted ore. An upper portion of the extraction portion DP is undercut and then blasted so as to cause the ore to naturally collapse, and accordingly, the ore can be mined from the extraction portion DP. By extracting the ore from the lower portion of the vein allows the collapse to be transmitted to the upper portion, making it possible to extract the ore of the vein efficiently.

In the present embodiment, a management facility 3 equipped with a management device 80 is arranged above the ground or inside an underground mine. A mining site is managed by a management system 100 that includes the management facility 3. The management facility 3 can communicate with a mining machine inside the underground mine including the transport machine 1 and the loading machine 2 via a communication system 4. In the present embodiment, the communication system 4 includes wireless communication such as Wi-Fi. The communication system 4 is connected with the management facility 3 by a wired connection and has a repeater 4A arranged inside the underground mine. One or both of the transport machine 1 and the loading machine 2 communicate the management facility 3 via the repeater 4A.

Figure 2:
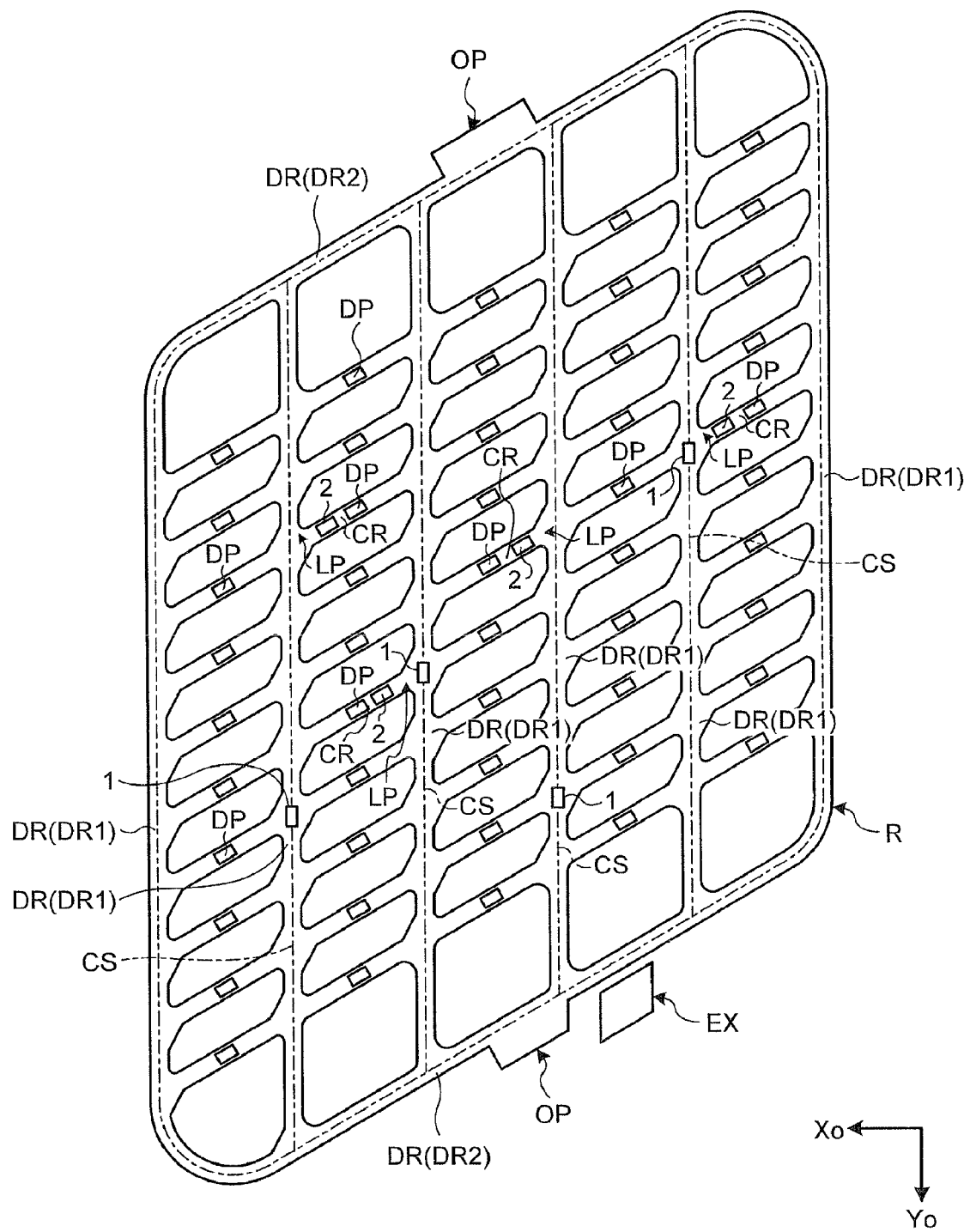
FIG. 2 is a schematic diagram illustrating an exemplary tunnel according to the present embodiment.
Figure 3:
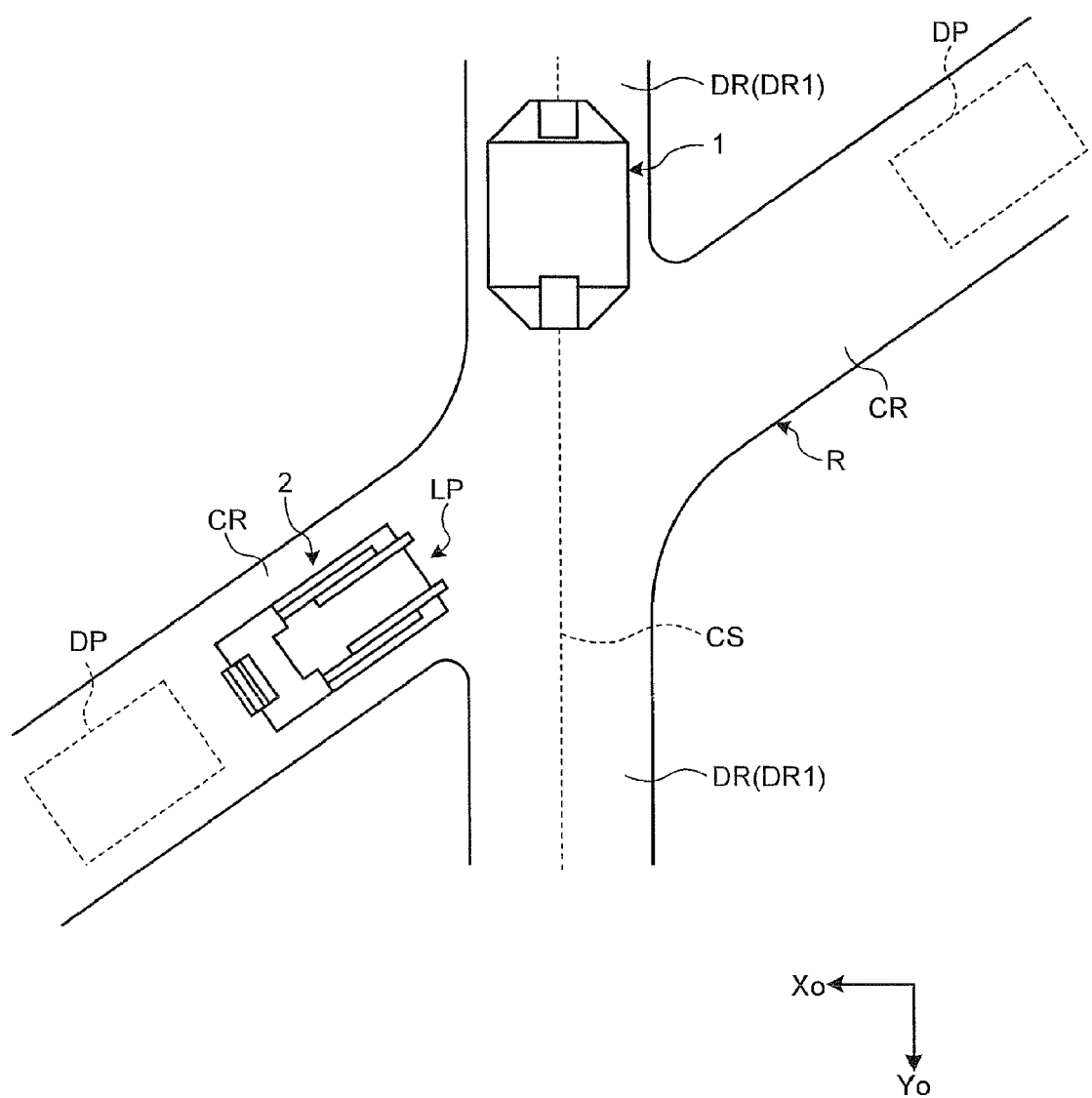
FIG. 3 is a partially enlarged diagram of FIG. 2.

FIG. 2 is a schematic diagram illustrating an exemplary underground mine. FIG. 3 is a partially enlarged view of FIG. 2. In the present embodiment, the tunnel R includes a first tunnel DR and a second tunnel CR. The transport machine 1 travels inside the first tunnel DR. The second tunnel CR is connected with the extraction portion DP. The loading machine 2 that performs loading operation is arranged inside the second tunnel CR. In the present embodiment, the transport machine 1 is an unmanned vehicle and travels autonomously in the tunnel R according to a predetermined route CS. Loading operation onto the transport machine 1 is performed by the loading machine 2 at a loading position LP, which has been determined to be inside or in the vicinity of the second tunnel CR. Inside the underground mine, there is provided a dumping position (OP) from which the load transported by the transport machine 1 is discharged.

The extraction portion DP is also called as a drawpoint or a drawbell. Hereinafter, the extraction point DP is referred to as a drawpoint DP. Hereinafter, the first tunnel DR is referred to as a drift DR, the second tunnel CR is referred to as a crosscut CR, and the dumping position OP is referred to as an ore path OP. An area including the drawpoint DP and the loading position LP may be referred to as a loading location. An area including the ore path OP may be referred to as a dumping location. A load is loaded onto the transport machine 1 at the loading position LP in the vicinity of the drawpoint DP by the loading machine 2. Thereafter, the transport machine 1 travels along the drift DR to reach the ore path OP and discharges the load at the ore path OP.

Hereinafter, for convenience of description, a road surface of the tunnel R along which the transport machine 1 travels and an $X_0Y_0$ plane (horizontal surface) are substantially parallel. In practice, the road surface of tunnel R has, in many cases, irregularities, uphill slopes, and downhill slopes.

In FIG. 2, the plurality of drifts DR is provided within the $X_0Y_0$ plane. The plurality of drifts DR is arranged in the $XX_0$-axis direction, each of which includes a first drift DR1 that is elongated and extending in the $Y_0$-axis direction and a second drift DR2 that connects ends of the first drifts DR1. The ore path OP is provided at the second drift DR2.

As illustrated in FIG. 3, the crosscut CR is arranged on both sides of the single first drift DR1. A load is loaded onto the transport machine 1 by the loading machine 2, arranged on at least one of the crosscuts CR arranged on both sides of the drift DR1.

<Transport Machine>

Figure 4:
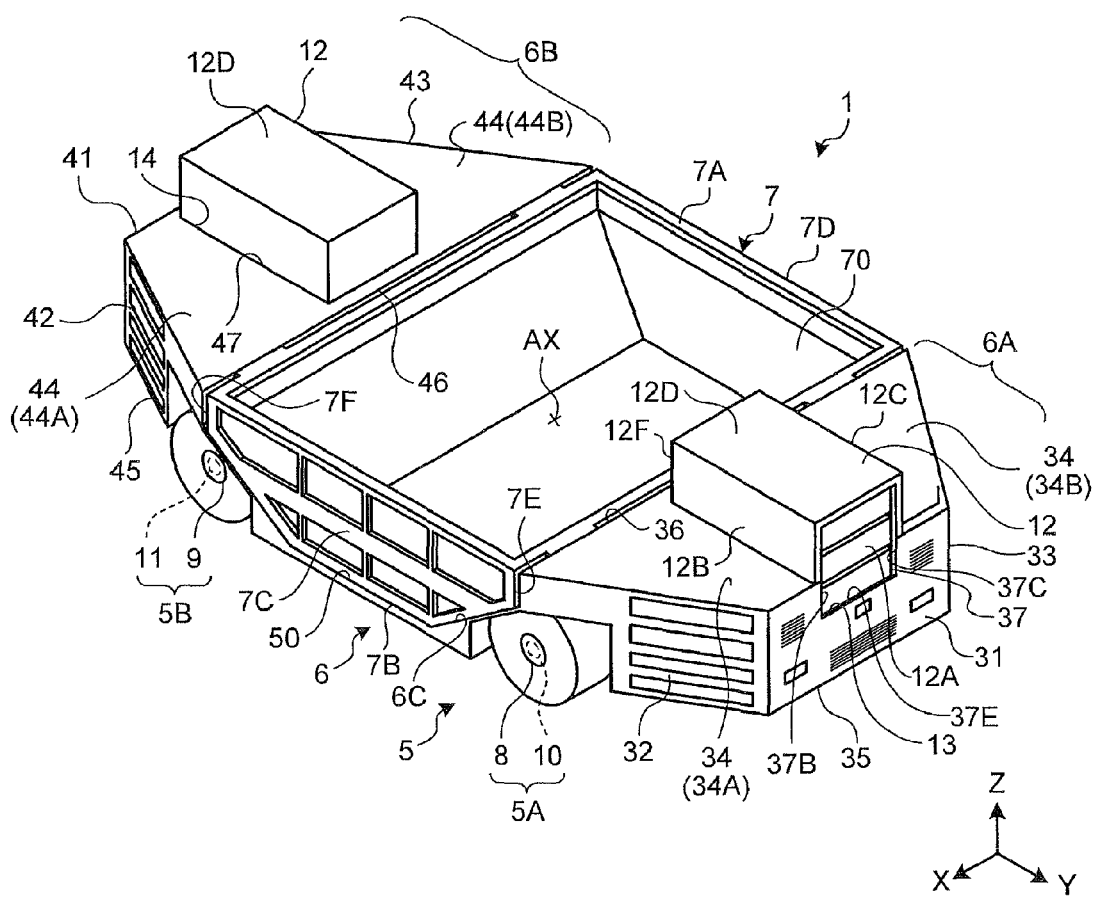
FIG. 4 is a perspective view of an exemplary transport machine according to the present embodiment.
Figure 5:
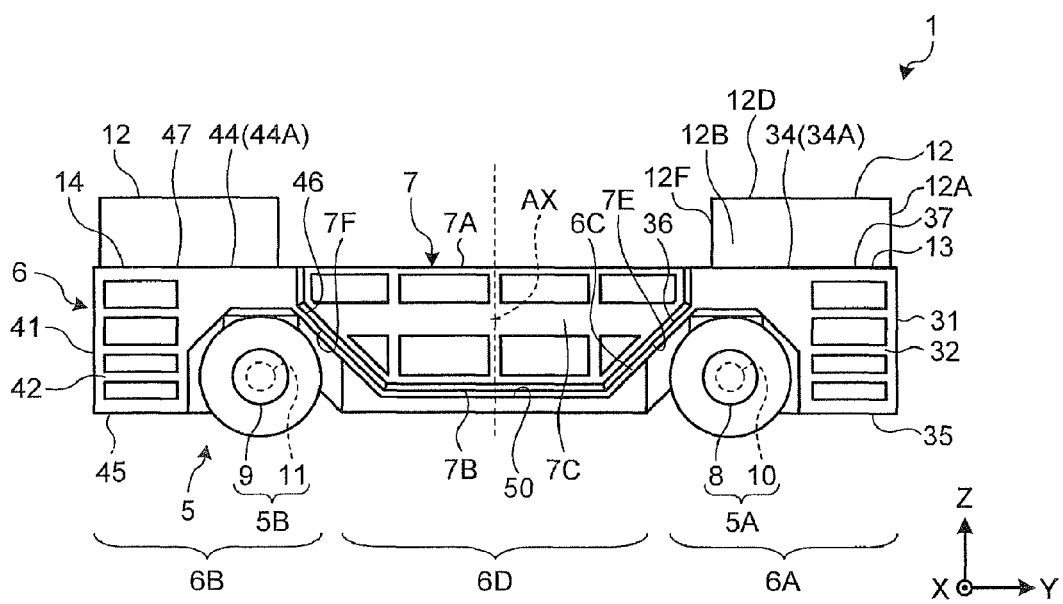
FIG. 5 is a side view of an exemplary transport machine according to the present embodiment.
Figure 6:
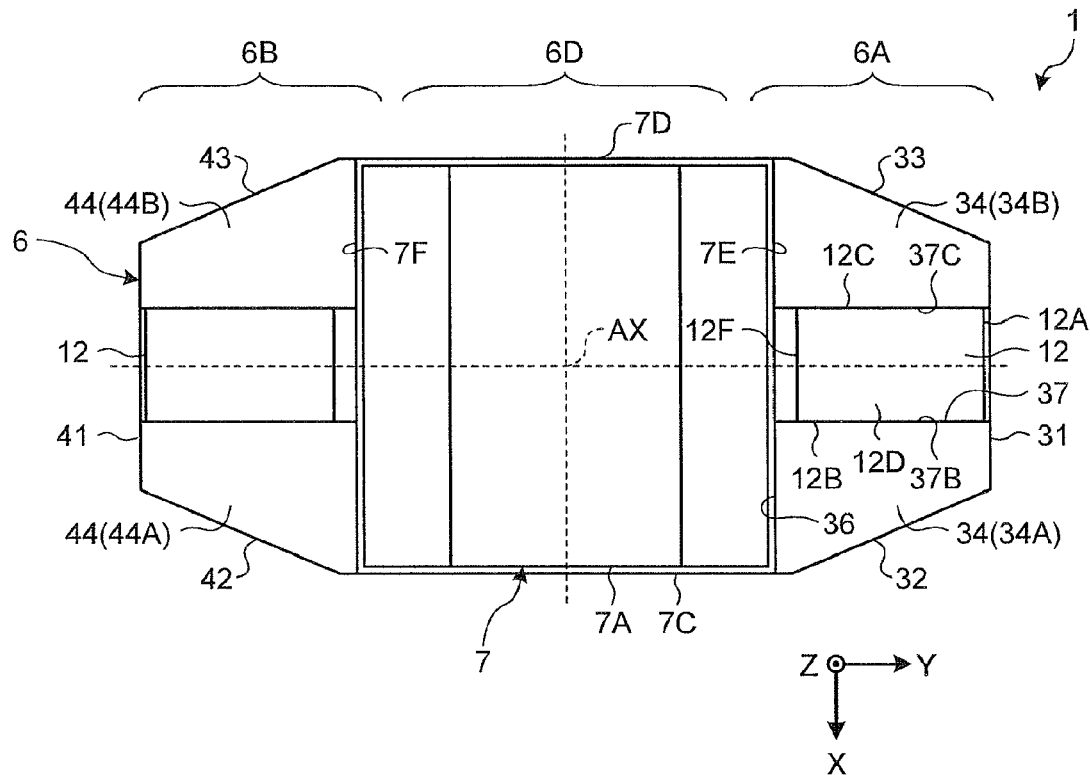
FIG. 6 is a top view of an exemplary transport machine according to the present embodiment.
Figure 7:
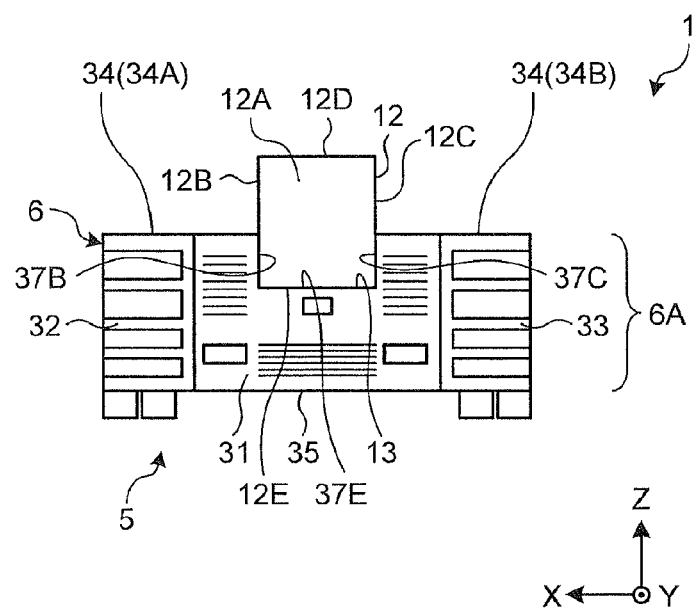
FIG. 7 is a front view of an exemplary transport machine according to the present embodiment.

Next, the transport machine 1 will be described. FIG. 4 is a perspective view of an exemplary transport machine 1. FIG. 5 is a side view of an exemplary transport machine 1. FIG. 6 is a top view of an exemplary transport machine 1. FIG. 7 is a front view of an exemplary transport machine 1.

Hereinafter, for convenience of description, a vehicle-width direction of the transport machine 1 is determined as the X-axis direction. Hereinafter, for convenience of description, it is assumed that a traveling direction (moving direction) of the transport machine 1 when it travels straight and the Y-axis direction are parallel, and that the transport machine 1 travels forward in a +Y direction. When the transport machine 1 is traveling straight, a rotation shaft of wheels (front wheel 8 and rear wheel 9) is parallel to the X-axis direction, and the rotation shaft of the wheels is orthogonal to the Y-axis. Directions indicated by the arrows in the diagrams represent +X, +Y, and +Z directions, respectively; the opposite directions represent −X, −Y, and −Z directions, respectively.

The transport machine 1 includes a traveling device 5, a vehicle body 6, and a vessel 7. At least a portion of the vehicle body 6 is arranged above the traveling device 5. The vessel 7 is supported by the vehicle body 6.

The traveling device 5 includes a front wheel 8, a rear wheel 9, a front wheel driving device 10 that drives the front wheel 8, and a rear wheel driving device 11 that drives the rear wheel 9. Hereinafter, a portion of the traveling device 5 including the front wheel 8 and the front wheel driving device 10 will be appropriately referred to as a front traveling device 5A, and a portion of the traveling device 5 including the rear wheel 9 and the rear wheel driving device 11 will be appropriately referred to as a rear traveling device 5B.

The vehicle body 6 includes a front section 6A, a rear section 6B, an intermediate section 6D, and a recess 6C. At least a portion of the front section 6A is arranged above the front wheel 8. At least a portion of the rear section 6B is arranged above the rear wheel 9. The intermediate section 6D is provided between the front section 6A and the rear section 6B. The recess 6C is arranged between the front section 6A and the rear section 6B. The intermediate section 6D is arranged so as to connect a lower portion of the front section 6A and a lower portion of the rear section 6B. The recess 6C is defined by the front section 6A, the rear section 6B, and the intermediate section 6D. The recess 6C is arranged between the front wheel 8 and the rear wheel 9 with respect to the Y-axis direction.

The vessel 7 is a member into which a load is loaded by the loading machine 2. At least a portion of the vessel 7 is arranged at the recess 6C. At least a portion of the vessel 7 is arranged between the front traveling device 5A and the rear traveling device 5B with respect to the Y-axis direction.

The front section 6A includes a holding section 13 that removably holds a device 12. The rear section 6B includes a holding section 14 that removably holds the device 12. In the present embodiment, the device 12 includes a battery. Each of the holding section 13 and the holding section 14 has a connector through which power is supplied from a battery 12. An electronic device and an electric motor included in the transport machine 1 are operated by power supplied from the battery 12.

In the present embodiment, a portion of (front half of) the vehicle body 6, arranged in front of a center AX of the vehicle body 6, and a portion of (rear half of) the vehicle body 6, arranged in rear of the center AX of the vehicle body 6, with respect to the Y-axis direction, namely, the traveling direction of the traveling device 5, are arranged (front/rear) symmetrically. In addition, a portion of the traveling device 5, arranged in front of the center AX of the vehicle body 6, and a portion of the traveling device 5, arranged in rear of the center AX of the vehicle body 6, with respect to the Y-axis direction, are arranged symmetrically. In addition, a portion of the vessel 7, arranged in front of the center AX of the vehicle body 6, and a portion of the vessel 7, arranged in rear of the center AX of the vehicle body 6, with respect to the Y-axis direction, are arranged symmetrically.

In the present embodiment, being symmetric (front/rear symmetric) means that, with respect to a virtual plane (symmetrical plane) that passes through the center AX and is parallel with the XZ plane, a portion arranged in one side (+Y side, front side) and another side (−Y side, rear side) are mirror-symmetrical.

In addition, in the present embodiment, with respect to the X-axis direction intersecting with the traveling direction of the traveling device 5, a portion of the vehicle body 6 arranged in the right direction from the center AX of the vehicle body 6 (right half portion) and a portion of the vehicle body 6 arranged in the left direction from the center AX of the vehicle body 6 (left half portion) are arranged symmetrically (left/right symmetric). In addition, a portion of the traveling device 5, which is arranged in the right direction of the center AX of the vehicle body 6, and a portion of the traveling device 5, which is arranged in the left direction of the center AX of the vehicle body 6, are arranged symmetrically with respect to the X-axis direction. In addition, a portion of the vessel 7, which is arranged in the right direction from the center AX of the vehicle body 6, and a portion of the vessel 7, which is arranged in the left direction from the center AX of the vehicle body 6, are arranged symmetrically with respect to the X-axis direction.

In the present embodiment, being symmetric (left/right symmetric) means that, with respect to a virtual surface (symmetrical surface) that passes through the center AX and is parallel with the YZ plane, a portion arranged in one side (+X side, right side) and another side (−X side, left side) are mirror-symmetrical.

In the present embodiment, being symmetric includes at least one of a case where forms are symmetric and a case where structures are symmetric. That is, being symmetric includes one or both of having a symmetric form and having a symmetric structure. Note that being symmetric includes at least one of a case where the portions are perfectly symmetric and a case where the portions are substantially symmetric.

A front half portion from the center AX of the vehicle body 6 with respect to the Y-axis direction includes the front section 6A and a front half of the intermediate section 6D, which is connected with the front section 6A and arranged in front of the center AX. A rear half portion from the center AX of the vehicle body 6 with respect to the Y-axis direction includes the rear section 6B and a rear half of the intermediate section 6D arranged in rear of the center AX. The form and structure of the front section 6A are substantially equal to the form and structure of the rear section 6B. The form and structure of the front half portion of the intermediate section 6D are substantially equal to the form and structure of the rear half portion of the intermediate section 6D.

The front section 6A includes a front surface 31, a side surface 32, a side surface 33, an upper surface 34, a lower surface 35, and a back surface 36. The side surface 32 is arranged on a +X side that is one side of the front surface 31. The side surface 33 is arranged at a −X side that is another side of the front surface 31. The back surface 36 is arranged in an opposite direction from the front surface 31 and faces the vessel 7. The front surface 31 is substantially parallel to the XZ plane. Each of the side surface 32 and the side surface 33 is substantially orthogonal to the XY plane and tilted with respect to the YZ plane. The side surface 32 and the side surface 33 are tilted such that a distance between the side surface 32 and the side surface 33 is gradually reduced from the center AX in the +Y direction, namely, the moving direction of the transport machine 1. The lower surface 35 may be substantially parallel to the XY plane, or at least a portion of the lower surface 35 may be tilted upwardly from the center AX in the +Y direction. The form and area of the front surface 31 are smaller than the form and area of the back surface 36. The form and area of the side surface 32 are equal to the form and area of the side surface 33.

The front section 6A includes a recess 37 in which the battery 12 is arranged. The recess 37 is provided on an upper portion of the front section 6A. On the recess 37, the holding section 13 is provided. The upper surface 34 is arranged at least on a portion of a circumference of an upper-end opening of the recess 37. In the present embodiment, the recess 37 is formed so as to connect the front surface 31 and the back surface 36. The upper surface 34 is arranged on both sides of the recess 37 with respect to the X-axis direction that intersects with the traveling direction of the traveling device 5. Hereinafter, the upper surface 34 that includes a +X side end of the front section 6A and is arranged on the +X side of the recess 37 will be appropriately referred to as an upper surface 34A. The upper surface 34 that includes a −X side end of the front section 6A and is arranged on the −X side of the recess 37 will be appropriately referred to as an upper surface 34B. The +X side end of the front section 6A includes an upper end of the side surface 32. The −X side end of the front section 6A includes an upper end of the side surface 33.

Each of the upper surface 34A and the upper surface 34B is substantially parallel to the XY plane. The upper surface 34A and the upper surface 34B are equally positioned with respect to the Z-axis direction. The position with respect to the Z-axis direction means a height. The upper surface 34A and the upper surface 34B are arranged within a same plane (flush with each other).

Note that a height of the upper surface 34A and a height of the upper surface 34B may differ. Also note that a device may be mounted on at least one of the upper surface 34A and the upper surface 34B.

The upper surface 34A and the upper surface 34B are equally formed. In the present embodiment, the recess 37 and the holding section 13 are arranged at a central portion of the front section 6A with respect to the X-axis direction. As described above, the vehicle body 6 is left/right symmetrical.

In the present embodiment, the battery 12 has a rectangular form. The battery 12 includes a front surface 12A, a side surface 12B, a side surface 12C, an upper surface 12D, a lower surface 12E, and a back surface 12F. The recess 37 has a shape that corresponds to the form of the battery 12. An inner surface of the recess 37 includes a bottom surface 37E, a first inner surface 37B and a second inner surface 37C. The bottom surface 37E faces the lower surface 12E of the battery 12. The first inner surface 37B faces the side surface 12B of the battery 12. The second inner surface 37C faces the side surface 12C of the battery 12. The bottom surface 37E of the recess 37 and the first inner surface 37B of the recess 37 are substantially orthogonal to each other. The bottom surface 37E of the recess 37 and the second inner surface 37C of the recess 37 are substantially orthogonal to each other.

While the battery 12 is held by the holding section 13 of the recess 37, the upper surface 12D of the battery 12 is arranged between a first upper surface 34A and a second upper surface 34B, with respect to the X-axis direction. In the present embodiment, the depth of the recess 37 is smaller than the height of the battery 12. The depth of the recess 37 corresponds to the dimension of the first inner surface 37B and the dimension of the second inner surface 37C with respect to the Z-axis direction. The height of the battery 12 corresponds to the dimension of the battery 12 with respect to the Z-axis direction. While the battery 12 is held by the holding section 13 of the recess 37, the upper surface 12D of the battery 12 is arranged above (+Z direction) the upper surface 34A and the upper surface 34B. In other words, the upper surface 34 (upper surface 34A and upper surface 34B) of the front section 6A is arranged below (−Z direction) the upper surface 12D of the battery 12 held by the holding section 13.

The dimension of the battery 12 may be equal to or smaller than the dimension of the upper surface 34 with respect to the Y-axis direction. While the battery 12 is held by the holding section 13, the position of a +Y-side end of the upper surface 34 and the position of a +Y-side end of the battery 12 may overlap with each other but need not overlap with each other; the position of a −Y-side end of the upper surface 34 and the position of a −Y-side end of the battery 12 may overlap with each other but need not overlap with each other. The configuration may be such that, with respect to the Y-axis direction, the battery 12 is not arranged outside the upper surface 34 (not protruding), and the front surface 12A of the battery 12 and the front surface 31 of the front section 6A are arranged on a same plane.

The rear section 6B includes a rear surface 41, a side surface 42, a side surface 43, an upper surface 44, a lower surface 45, and a back surface 46. On an upper portion of the rear section 6B, a recess 47 is provided. The holding section 14 is arranged in the recess 47. On both sides of the recess 47, an upper surface 44A and an upper surface 44B are provided. As described above, the rear section 6B is formed symmetrically with the front section 6A. That is, with respect to the X-axis direction, the recess 47 and the holding section 14 are arranged at a center of the rear section 6B. The recess 47 and the holding section 14 are arranged between the upper surface 44A and the upper surface 44B. The upper surface 44 (upper surface 44A and upper surface 44B) of the rear section 6B is arranged below the upper surface 12D of the battery 12 held by the holding section 14. The upper surface 44A and the upper surface 44B are arranged within a same plane. In the present embodiment, the upper surface 34A, the upper surface 34B, the upper surface 44A, and the upper surface 44B are arranged within a same plane.

Note that the height of the upper surface 44A may differ from the height of the upper surface 44B. In addition, a device may be mounted on at least one of the upper surface 44A and the upper surface 44B.

In the present embodiment, the form and structure of the battery 12 held by the holding section 13 are substantially equal to the form and structure of the battery 12 held by the holding section 14. Therefore, even in a state where the battery 12 is held by the holding section 13 and the battery 12 is held by the holding section 14, the transport machine 1 is front/rear symmetrical and left/right symmetrical.

In the present embodiment, power supplied from the battery 12 held by the holding section 13 and power supplied from the battery 12 held by the holding section 14 are added together, and then, the added power is distributed to an electronic device and an electric motor arranged at a front half portion of the transport machine 1 and to an electronic device and an electric motor arranged at a rear half portion of the transport machine 1. The electronic device and the electric motor arranged at the front half portion of the transport machine 1 may be operated by the power supplied from the battery 12 held by the holding section 13. The electronic device and the electric motor arranged at the rear half portion of the transport machine 1 may be operated by the power supplied from the battery 12 held by the holding section 14.

The vessel 7 includes a recess 70, an upper surface 7A, a lower surface 7B, a side surface 7C, a side surface 7D, a facing surface 7E and a facing surface 7F. The recess 70 houses a load. The upper surfaces 7A and 7B are arranged around an opening at an upper end of the recess 70. The side surface 7C faces the +X-side. The side surface 7D faces the −X-side. The facing surface 7E faces the back surface 36 of the front section 6A. The facing surface 7F faces the back surface 46 of the rear section 6B. The facing surface 7E is tilted upwardly from the center AX in the +Y direction. The facing surface 7F is tilted upwardly from the center AX in the −Y direction. The form and structure of the front half of the vessel 7, including the facing surface 7E, arranged in front of the center AX are substantially equal to the form and structure of the rear half of the vessel 7, including the facing surface 7F, arranged in rear of the center AX.

The recess 6C has a shape that corresponds to the form of the vessel 7. An inner surface of the recess 6C includes a bottom surface 50 capable of facing at least a portion of the lower surface 7B, the back surface 36 and the back surface 46. The bottom surface 50 of the vehicle body 6 is substantially parallel to the XY plane. The back surface 36 of the vehicle body 6 is tilted upwardly from the center AX in the +Y direction. The back surface 46 of the vehicle body 6 is tilted upwardly from the center AX in the −Y direction.

With respect to the X-axis direction, the vehicle body 6 and the vessel 7 have substantially same dimensions. In a case where the vessel 7 and the vehicle body 6 have been positioned such that the center of the vehicle body 6 and the center of the vessel 7 overlap with each other with respect to the X-axis direction, the position of the side surface 7C, the position of a +X-side end of the back surface 36, and the position of a +X-side end of the back surface 46 overlap with each other, and the position of the side surface 7D, the position of a −X-side end of the back surface 36, and the position of a −X-side end of the back surface 46 overlap with each other, with respect to the X-axis direction. In other words, with respect to the X-axis direction, the side surface 7C is not arranged outside the side surface 32 nor outside the side surface 42; the side surface 7D is not arranged outside the side surface 33 nor outside the side surface 43. Note that in a state where the vessel 7 and the vehicle body 6 are positioned such that the center of the vehicle body 6 and the center of the vessel 7 overlap with each other with respect to the X-axis direction, the side surface 7C may protrude outer than the side surface 32 and the side surface 42; the side surface 7D may protrude outer than the side surface 33 and the side surface 43.

The upper surface 7A of the vessel 7 is arranged below the upper surface 12D of the battery 12 held by at least one of the holding section 13 and the holding section 14. The upper surface 7A of the vessel 7 is arranged below the upper surface 34 of the front section 6A and the upper surface 44 of the rear section 6B. The upper surface 7A may be arranged below the upper surface 12D, above the upper surface 34 and the upper surface 44, or to be at a height that is same as the height of the upper surface 34 and the upper surface 44 (may be within a same plane).

The front traveling device 5A is arranged on the +Y side in front of the center AX. The rear traveling device 5B is arranged on the −Y side in rear of the center AX. The form and structure of the front traveling device 5A are substantially equal to the form and structure of the rear traveling device 5B.

Figure 8:
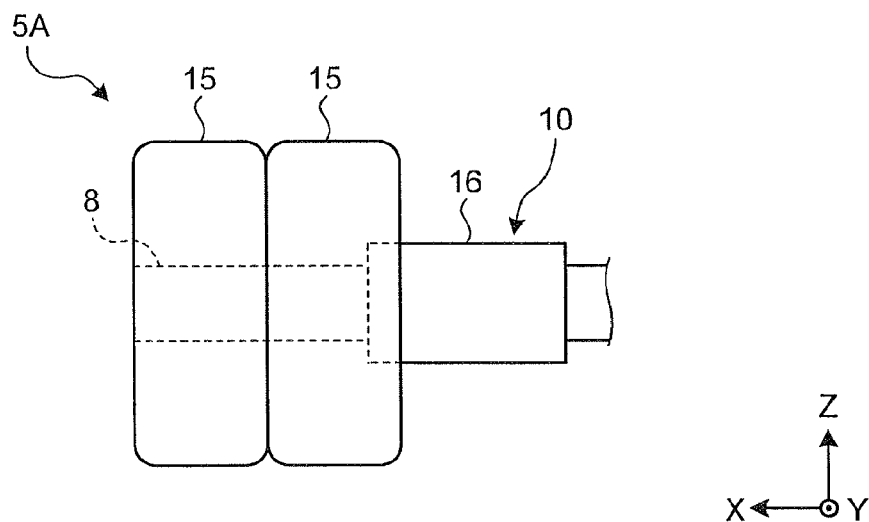
FIG. 8 is a schematic diagram illustrating an exemplary traveling device according to the present embodiment.

FIG. 8 is a diagram illustrating a portion of the front traveling device 5A. The front traveling device 5A includes the front wheel 8 and the front wheel driving device 10 that drives the front wheel 8. The front wheel 8 supports a tire 15. In the present embodiment, the front wheel 8 is arranged on both sides of the center AX of the vehicle body 6 with respect to the X-axis direction. The front wheel 8 may include one tire 15 or two tires. As illustrated in FIG. 8, in the present embodiment, one front wheel 8 includes two tires 15. That is, in the present embodiment, the front traveling device 5A has a double-tire form.

The tire 15 is a solid tire. No gas is filled inside the tire 15. This reduces the diameter of the tire 15, suppressing an increase in the height of the transport machine 1. Alternatively, the tire 15 may be a pneumatic tire (tire filled with air).

The front wheel driving device 10 includes an electric motor (in-wheel motor) 16 at least a portion of which is arranged in a hub of the front wheel 8. The electric motor 16 operates on power supplied from the battery 12. Power is supplied to the electric motor 16 of the front wheel driving device 10 from the battery 12 held by the holding section 13 of the front section 6A. The electric motor 16 for driving the front wheel 8 operates on the power supplied from the battery 12 held by the holding section 13 of the front section 6A. The electric motor 16 is provided for each of two front wheels 8.

The configuration of the rear traveling device 5B (not illustrated) is similar to the configuration of the front traveling device 5A. The rear wheel 9 of the rear traveling device 5B is arranged on both sides of the center AX of the vehicle body 6 with respect to the X-axis direction. The rear traveling device 5B has a double-tire system. The form and structure of the tire 15 supported by the front wheel 8 and the form and structure of the tire 15 supported by the rear wheel 9 are substantially equal. The rear wheel driving device 11 includes the electric motor 16 connected to each of the two rear wheels 9. Power is supplied to the electric motor 16 of the rear wheel driving device 11 from the battery 12 held by the holding section 14 of the rear section 6B. The electric motor 16 to drive the rear wheel 9 operates on the power supplied from the battery 12 held by the holding section 14 of the rear section 6B.

In this manner, in the present embodiment, the front wheel 8 is driven by the front wheel driving device 10, and the rear wheel 9 is driven by the rear wheel driving device 11. In short, the traveling device 5 operates on a whole-wheel-drive system, in which all four wheels are driven by a driving device. Note that the front wheel driving device 10 drives the front wheel 8 and does not drive the rear wheel 9. The rear wheel driving device 11 drives the rear wheel 9 and does not drive the front wheel 8.

Figure 9:
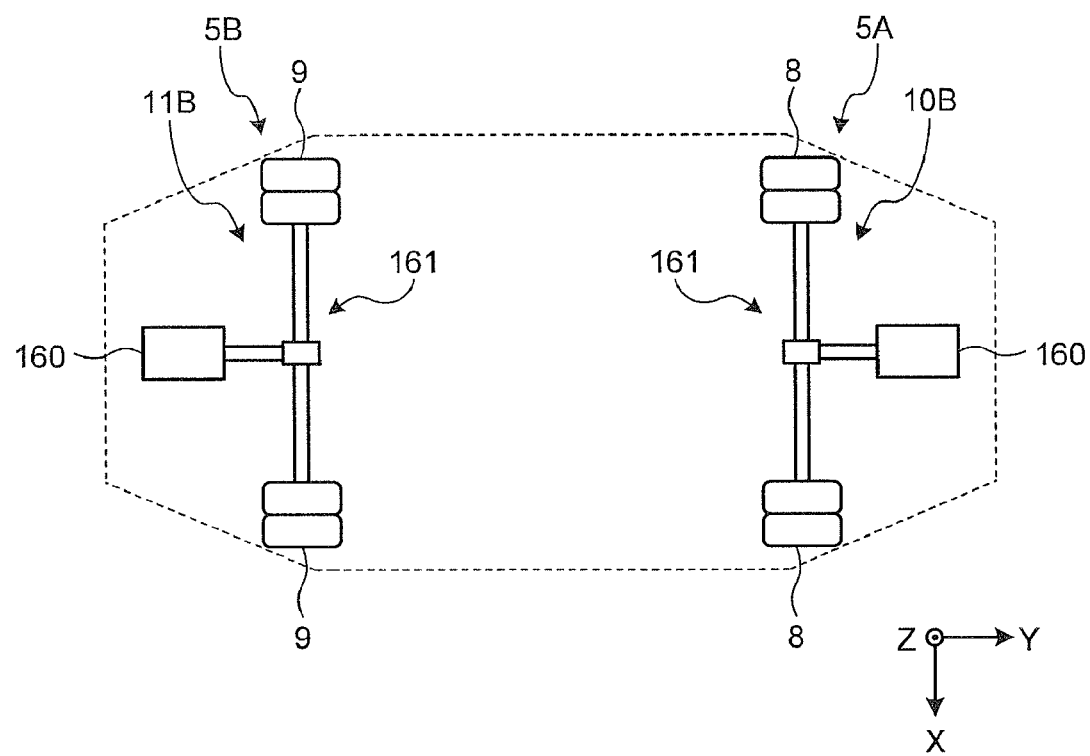
FIG. 9 is a schematic diagram illustrating an exemplary traveling device according to the present embodiment.

FIG. 9 is a schematic diagram illustrating an exemplary traveling device 5. The front traveling device 5A of the traveling device 5 includes the front wheel 8 and a front wheel driving device 10B that drives the front wheel 8. The front wheel driving device 10B includes an electric motor 160 and a power transmission device 161 that transmits the power generated by the electric motor 160 to each of left/right front wheels 8. The power transmission device 161 includes a transaxle that combines a transmission and a differential gear. A rear wheel driving device 11B that drives the rear wheel 9 has a structure equivalent to the structure of the front wheel driving device 10B. The transport machine 1 may travel by the traveling device 5 illustrated in FIG. 9.

In the present embodiment, the transport machine 1 can move in each of +Y and −Y directions. Accordingly, in the above-described example, when the transport machine 1 travels in the −Y direction, the rear section 6B functions as a front section, the rear wheel 9 functions as a front wheel, the front section 6A functions as a rear section, and the front wheel 8 functions as a rear wheel.

In the present embodiment, each of the front wheel 8 and the rear wheel 9 functions as a steered wheel. For example, when the transport machine 1 moves in the +Y direction, the front wheel 8 functions as a steered wheel; when the transport machine 1 moves in the −Y direction, the rear wheel 9 functions as a steered wheel. Alternatively, when the transport machine 1 moves at least in one of the +Y and −Y directions, both the front wheel 8 and the rear wheel 9 may function as steered wheels.

Figure 10:
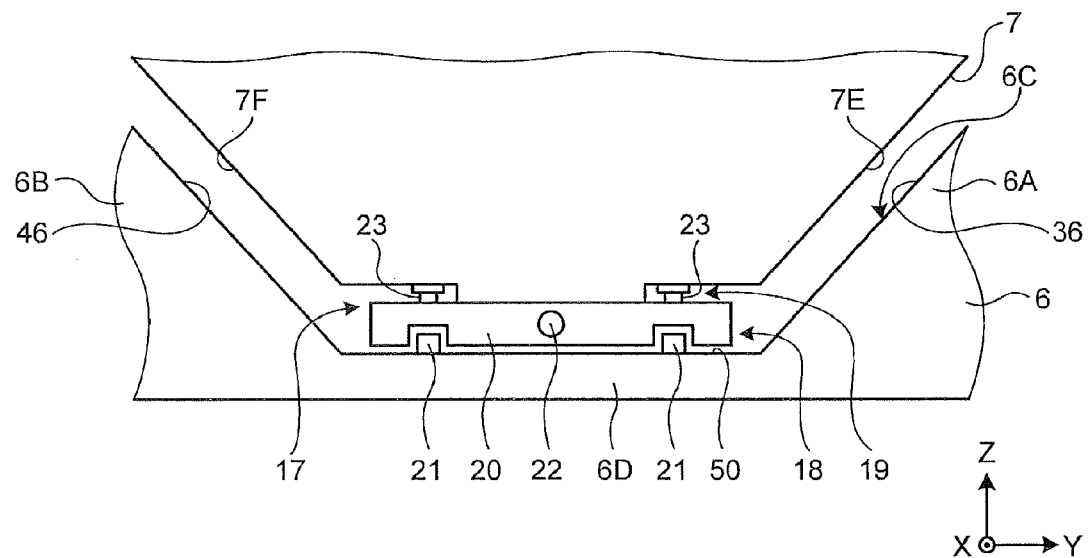
FIG. 10 is a schematic diagram illustrating an exemplary support device according to the present embodiment.

FIG. 10 is a schematic diagram illustrating an exemplary support device 17 that supports the vessel 7. The support device 17 supports the vessel 7 movably. At least a portion of the support device 17 is arranged between the vehicle body 6 and the vessel 7. The support device 17 supports the vessel 7 movably with respect to the vehicle body 6.

The support device 17 includes a slide mechanism 18 and a side dump mechanism 19. The slide mechanism 18 moves the vessel 7 in the X-axis direction with respect to the vehicle body 6. The side dump mechanism 19 discharges a load of the vessel 7 in the X-axis direction. The side dump mechanism 19 discharges the load from the vessel 7 by tilting the vessel 7 around an axis parallel to the Y-axis direction.

The slide mechanism 18 is arranged between the vehicle body 6 (bottom surface 50 of the recess 6C) and the lower surface 7B of the vessel 7. The slide mechanism 18 includes a slide table 20, a guide mechanism 21, and a hydraulic cylinder 22. The slide table 20 is movable in the X-axis direction. The guide mechanism 21 is arranged on the vehicle body 6 and guides the slide table 20 that moves in the X-axis direction. The hydraulic cylinder 22 moves the slide table 20 in the X-axis direction. The hydraulic cylinder 22 is connected to at least a portion of the slide table 20. With operation of the hydraulic cylinder 22, the slide table 20 moves in the X-axis direction.

The vessel 7 is supported by the slide table 20. Accordingly, when the slide table 20 moves in the X-axis direction, the vessel 7 moves in the X-axis direction together with the slide table 20. The vessel 7 is movable in each of one direction (+X direction) and another direction (−X direction), with respect to the X-axis direction.

The side dump mechanism 19 includes a hoist cylinder 23 arranged between the slide table 20 and the vessel 7. As illustrated in FIG. 10, there may be provided two hoist cylinders 23. With operation of the hoist cylinder 23, the vessel 7 is lifted up.

Figure 11:
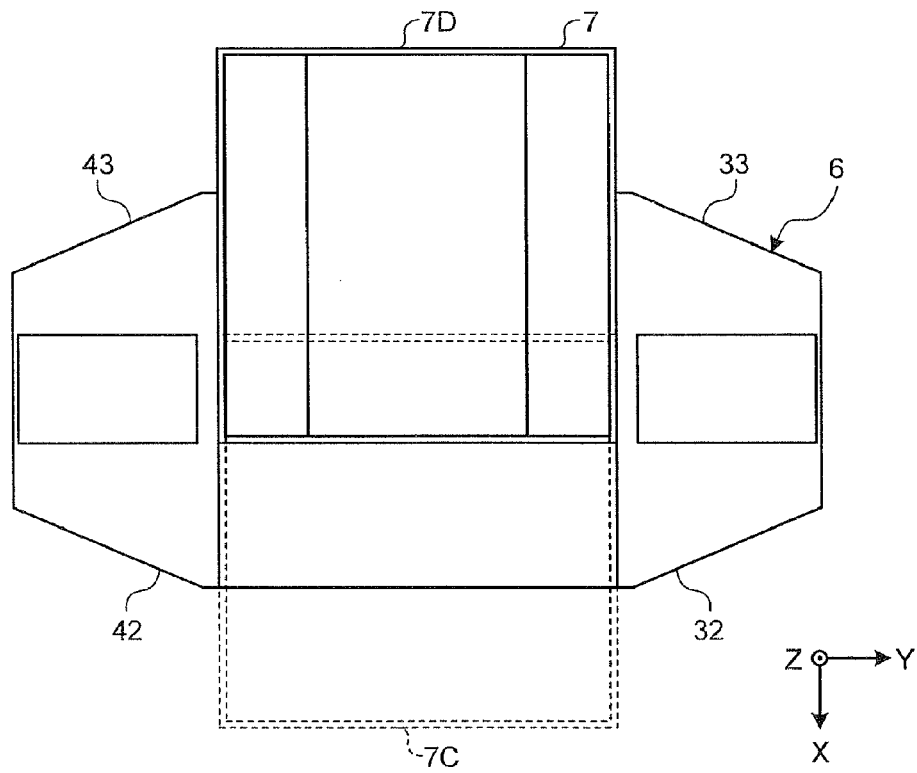
FIG. 11 is a schematic diagram illustrating exemplary operation of a vessel according to the present embodiment.

FIG. 11 is a schematic diagram illustrating an exemplary state in which the vessel 7 moves by the slide mechanism 18. In the present embodiment, the vehicle body 6 and the vessel 7 have substantially the same dimensions with respect to the X-axis direction. When the vessel 7 and the vehicle body 6 are positioned such that the center of the vehicle body 6 and the center of the vessel 7 overlap with each other with respect to the X-axis direction, the vessel 7 does not protrude outer than the vehicle body 6.

As illustrated in FIG. 11, the slide mechanism 18 can move the vessel 7 such that at least a portion of the vessel 7 is arranged on each of one or another side of the vehicle body 6 with respect to the X-axis direction. In other words, the slide mechanism 18 can move the vessel 7 in the +X direction, by using the hydraulic cylinder 22, such that one side surface 7C on the vessel 7 is arranged outside one side surface 32 and one side surface 42 of the vehicle body 6. In addition, the slide mechanism 18 can move the vessel 7 in the −X direction, by using the hydraulic cylinder 22, such that the other side surface 7D on the vessel 7 is arranged outside the other side surface 33 and the other side surface 43 of the vehicle body 6. In this manner, the slide mechanism 18 slides the vessel 7 to both sides with respect to the X-axis direction.

Figure 12:
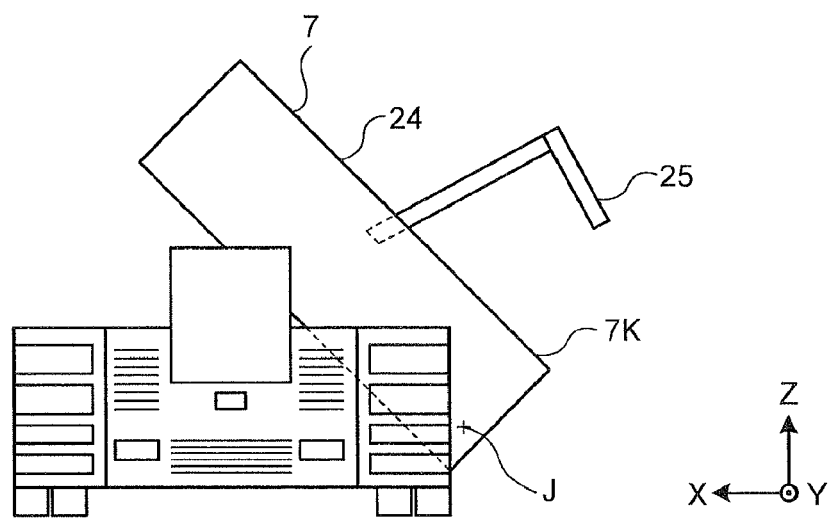
FIG. 12 is a schematic diagram illustrating exemplary operation of the vessel according to the present embodiment.

FIG. 12 is a schematic diagram illustrating an exemplary state in which the vessel 7 is lifted up by the side dump mechanism 19. As illustrated in FIG. 11, the side dump mechanism 19 tilts the vessel 7 around a shaft J parallel to the Y-axis. In short, in the present embodiment, the transport machine 1 discharges the load from the vessel 7 using a side-dump system. In the present embodiment, the vessel 7 includes a vessel main body 24, and a side gate 25, which is pivotable with respect to the vessel main body 24. The side gate 25 pivots in synchronization with tilting (rising) movement of the vessel main body 24. With this operation, an opening 7K is formed between the vessel main body 24 and the side gate 25. The load of the vessel 7 is discharged to a side of the transport machine 1 through the opening 7K. Note that the state that the rotation shaft of the vessel 7, namely, the shaft J, and the Y-axis are parallel includes at least one of a state where the Y-axis and the shaft J are perfectly parallel, and a state where the Y-axis and the shaft J are substantially parallel. Alternatively, the shaft J may be non-parallel to the Y-axis. For example, an angle formed by the shaft J and the Y-axis may be one or more degrees and 45 or less degrees.

In the present embodiment, in a state where the vessel 7 is not lifted up, the support device 17 is arranged below an upper end of the front wheel 8 and an upper end of the rear wheel 9. In other words, in a state where the transport machine 1 is traveling along the drift DR, the support device 17 is arranged below the upper end of the front wheel 8 and below the upper end of the rear wheel 9.

Figure 13:
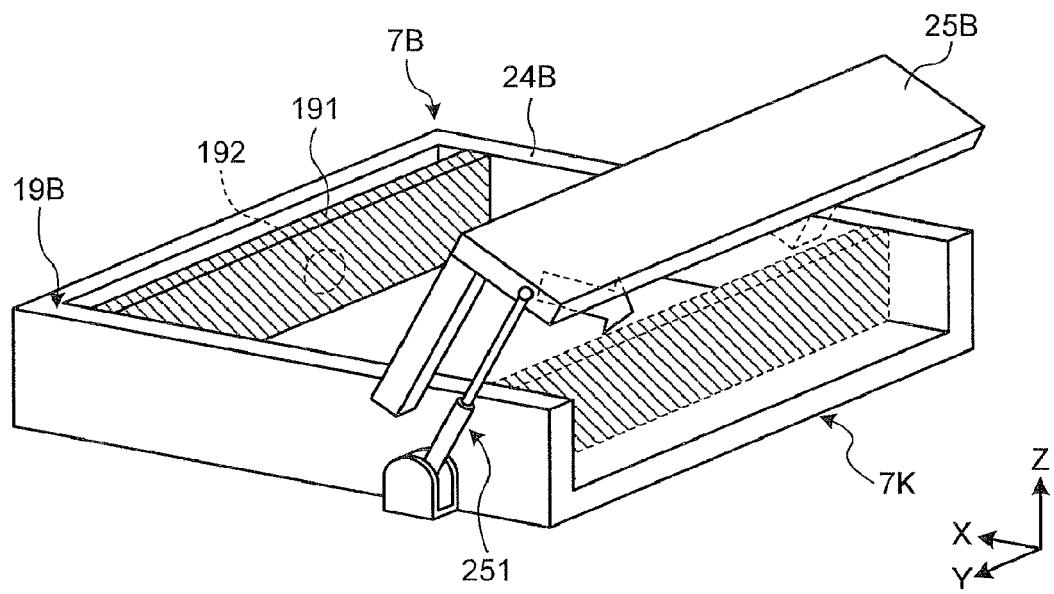
FIG. 13 is a schematic diagram illustrating exemplary operation of the vessel according to the present embodiment.

FIG. 13 is a schematic diagram illustrating an exemplary side dump mechanism 19B. The side dump mechanism 19B illustrated in FIG. 13 uses a side ejector system to discharge the load from the vessel 7B in the X-axis direction. In FIG. 13, the vessel 7B includes a vessel main body 24B, and a side gate 25B that is pivotable with respect to the vessel main body 24B. The side gate 25B is pivotably moved by the power of a cylinder mechanism 251. The side dump mechanism 19B includes a plate 191, and a driving device 192. The plate 191 is arranged on the vessel main body 24B. The driving device 192 moves the plate 191 in the X-axis direction. The driving device 192 includes a multi-stage cylinder mechanism arranged between the vessel main body 24B and the plate 191. When the load of the vessel 7 is discharged, the side gate 25B is raised by the cylinder mechanism 251. With this operation, an opening 7K is formed between the vessel main body 24B and the side gate 25B. In a state where the opening 7K is formed, the driving device 192 moves the plate 191 in the X-axis direction (−X direction in the example of FIG. 13). The load of the vessel 7B is discharged to a side of the transport machine 1 through the opening 7K.

<Autonomous Traveling>

Figure 14:
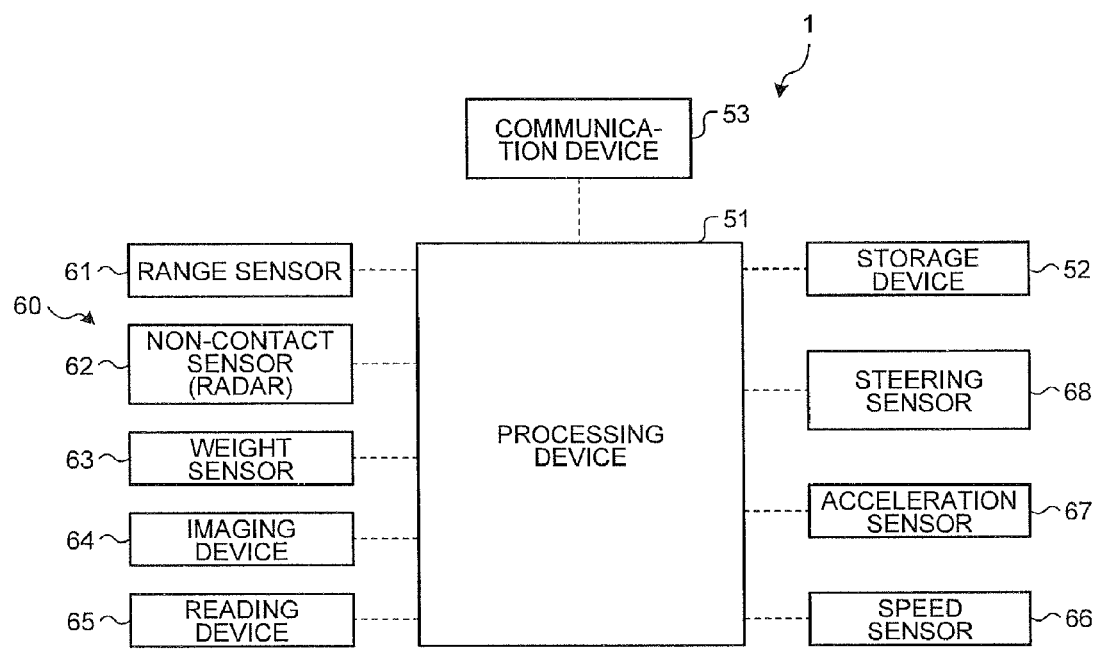
FIG. 14 is a block diagram illustrating an exemplary processing device and detection system according to the present embodiment.

Next, traveling of the transport machine 1 will be described. In the present embodiment, the transport machine 1 is an unmanned vehicle, which is an autonomous traveling vehicle capable of traveling autonomously. FIG. 14 is a functional block diagram including a detection system 60 of the transport machine 1.

As illustrated in FIG. 14, the transport machine 1 includes a processing device 51, a storage device 52, a communication device 53, and the detection system 60. The detection system 60 includes a range sensor 61, a non-contact sensor 62, a weight sensor 63, an imaging device 64, a reading device 65, a speed sensor 66, an acceleration sensor 67, and a steering sensor 68. The range sensor 61 outputs physical shape data of a space. The non-contact sensor 62 detects an obstacle. The weight sensor 63 detect the weight of the vessel 7. The imaging device 64 can obtain an optical image of an object and detect the form of the object. The reading device 65 detects a mark M (refer to FIG. 14) provided on the drift DR. The speed sensor 66 detects a traveling speed of the transport machine 1. The acceleration sensor 67 detects acceleration or an angular speed of the transport machine 1. The steering sensor 68 detects at least one of steering angles of the front wheel 8 and the rear wheel 9.

The processing device 51 includes a central processing unit (CPU). The processing device 51, based on a result of detection by the detection system 60, controls the traveling device 5 such that the transport machine 1 moves to a predetermined target position. The processing device 51 controls the traveling device 5 to travel along a predetermined route (target route) CS at a predetermined speed and acceleration by controlling the electric motor 16 (driving device) and a braking system of the traveling device 5, as well as controlling the steering angle of at least one of the front wheel 8 and the rear wheel 9.

The storage device 52 includes at least one of random access memory (RAM), read only memory (ROM), flash memory, and a hard disk drive, and is connected with the processing device 51. The storage device 52 stores various types of information required for autonomous traveling.

The communication device 53 is connected with the processing device 51 and performs data communication with one or both of the loading machine 2 and the management facility 3. The management facility 3 communicates with the communication device 53 of the transport machine 1 via the communication system 4. The communication device 53 wirelessly communicates with the management facility 3 via the repeater 4A arranged inside the underground mine. The communication device 53 can perform data communication with a communication device provided on the loading machine 2. The communication device 53 can receive information (including a command signal) transmitted from at least one of the management facility 3 and the loading machine 2. The communication device 53 can transmit information detected at the detection system 60 to at least one of the management facility 3 and the loading machine 2.

The range sensor 61 includes a scanning electro-optical distance measuring instrument capable of outputting physical shape data of a space. The range sensor 61 includes at least one of a laser scanner and a three-dimensional distance sensor, and is capable of obtaining three-dimensional spatial data. The range sensor 61 detects at least one of the loading machine 2 and a wall surface of the drift DR. In the present embodiment, the range sensor 61 can obtain at least one of shape data of the loading machine 2, shape data of a wall surface of the drift DR, and shape data of the load on the vessel 7. The range sensor 61 can detect at least one of a relative position with respect to the loading machine 2 (relative distance and orientation) and a relative position with respect to the wall surface of the drift DR. In other words, the range sensor 61 can function as at least one of a load detection device (form detection device), a loading machine detection device (first detection device), and a second detection device. The load detection device detects a state of load (form of load) on the vessel 7. The loading machine detection device detects the loading machine 2. The second detection device detects the drift DR (tunnel R). The range sensor 61 is connected with the processing device 51 and outputs a result of detection to the processing device 51. The range sensor 61 may include radar.

In the present embodiment, information regarding the wall surface of the drift DR has been predetermined and stored in the storage device 52. That is, the information regarding the wall surface of the drift DR is known information measured beforehand. The information regarding the wall surface of the drift DR includes information regarding each shape of a plurality of portions of the wall surface and information regarding an absolute position of each portions of the wall surface. The storage device 52 stores shape of a plurality of portions of the wall surface and a relationship between the shape and the absolute position of the portions of the wall surface having that shape. The processing device 51 can obtain the absolute position and orientation of the transport machine 1 in the drift DR based on a result of detection on the wall surface of the drift DR (shape data of wall surface) detected by the range sensor 61 provided on the transport machine 1 and based on information stored in the storage device 52. In this manner, the range sensor 61 can also function as a position detection device that detects a position of the transport machine 1 that travels along the drift CR (tunnel R).

The processing device 51 can control the traveling device 5 in the drift DR such that the transport machine 1 can travel according to the predetermined route CS based on a current position (absolute position) of the transport machine 1 measured by the range sensor 61.

The non-contact sensor 62 detect an obstacle in front of the transport machine 1. The non-contact sensor 62 includes radar. By emitting at least one of radio waves and ultrasonic waves, and receiving the radio waves reflected on the obstacle, the non-contact sensor 62 can detect a distance and orientation relative to the obstacle. The non-contact sensor 62 may include at least one of a laser scanner and a three-dimensional distance sensor. The non-contact sensor 62 is connected with the processing device 51 and outputs a result of detection to the processing device 51.

The weight sensor 63 detects a weight of the vessel 7. The weight sensor 63 can detect the weight of the vessel 7 and a weight of a load loaded onto the vessel 7. That is, the weight sensor 63 can function as a load detection device (weight detection device) that detects a state of the load on the vessel 7 (weight of the vessel 7). The weight sensor 63 is connected with the processing device 51 and outputs a result of detection to the processing device 51. The processing device 51, based on the result of detection by the weight sensor 63, obtains information regarding the weight of the load loaded onto the vessel 7, and presence/absence of load on the vessel 7. The weight sensor 63 may include a strain gage based load cell provided, for example, between the slide table 20 and the vessel 7, and may include a pressure sensor that detects hydraulic pressure of the hoist cylinder 23.

The imaging device 64 includes an imaging element such as a CCD, and can obtain an optical image of an object and detect a form of the object. In the present embodiment, the imaging device 64 includes a stereo camera and can obtain three-dimensional form data of the object. The imaging device 64 can detect a form (appearance of load) of the load of the vessel 7. That is, the imaging device 64 can function as a load detection device (form detection device) to detect a state of the load of the vessel 7 (form of load). The imaging device 64 is connected with the processing device 51 and outputs a result of detection to the processing device 51. The processing device 51, based on a result of detection by the imaging device 64, obtains information regarding a state of the load on the vessel 7. The form of the load on the vessel 7 may be detected by using at least one of a laser scanner and a three-dimensional distance sensor.

The reading device 65 detects the mark M provided on the drift DR. The mark M is arranged in plurality along with the drift DR. The mark M may be an identifier (code) such as a bar code and a two-dimensional code, or may be an identifier (tag) such as an IC tag and an RFID. The reading device 65 detects identification information or specific information of the mark M. The reading device 65 is connected with the processing device 51 and outputs a result of detection to the processing device 51.

In the present embodiment, the information regarding the position of the mark M (absolute position) in the drift DR is known information measured beforehand. Information regarding the absolute position of the mark M is stored in the storage device 52. The processing device 51 can obtain the absolute position of the transport machine 1 in the drift DR based on the result of detection on the mark M detected by the reading device 65 provided on the transport machine 1, namely, identification information or specific information on the mark M and based on stored information in the storage device 52. That is, the reading device 65 can also function as a position detection device that detects the position of the transport machine 1 that travels along the drift DR (tunnel R). The reading device 65 also functions as the second detection device to detect the mark M provided on the drift DR (tunnel R).

The processing device 51 can control the traveling device 5 in the drift DR such that the transport machine 1 can travel according to the predetermined route CS based on a current position (absolute position) of the transport machine 1 obtained by the reading device 65.

The mark M may be a structure such as a landmark. In a case where the mark M is a landmark, the reading device 65 may include radar. The reading device 65 emits radio waves from radar and receives at least a portion of the emitted radio waves reflected on the landmark, thereby making it possible to detect a relative distance and orientation with respect to the landmark. In a case where a position (absolute position) at which the landmark is arranged is known and information regarding the absolute position of the landmark has been stored in the storage device 52, the processing device 51 can obtain the absolute position of the transport machine 1 in the drift DR based on the detected value on the reading device 65 provided on the transport machine 1 and based on the information stored in the storage device 52.

Each of the speed sensor 66, the acceleration sensor 67, and the steering sensor 68 is connected with the processing device 51. The speed sensor 66 outputs a detection value of the traveling speed of the transport machine 1 onto the processing device 51. The acceleration sensor 67 outputs the detection value of the acceleration of the transport machine 1 onto the processing device 51. The steering sensor 68 outputs a detection value of the steering angle of at least one of the front wheel 8 and the rear wheel 9 onto the processing device 51.

In the present embodiment, the processing device 51, based on, for example, the detection values of the speed sensor 66 and the steering sensor 68, allows the traveling device 5 to travel according to dead reckoning navigation. In other words, the processing device 51 estimates a current position of the transport machine 1 using dead reckoning navigation, and controls the traveling device 5 in the drift DR such that the transport machine 1 travels according to the predetermined route CS.

Dead reckoning navigation is a navigation system of estimating a current position of an object (transport machine 1) based on orientation (orientation variation) and a moving distance from a reference position (origin) for which the absolute position is known. Orientation of the transport machine 1 is detected with the steering sensor 68 arranged on the transport machine 1. The moving distance of the transport machine 1 is detected by using the speed sensor 66 arranged on the transport machine 1. A detection value of the steering sensor 68 and a detection value of the speed sensor 66 are output onto the processing device 51 of the transport machine 1. The processing device 51 can obtain orientation of the transport machine 1 from a known reference position bases on the detection value of the steering sensor 68. The processing device 51 can obtain a moving distance of the transport machine 1 from the known reference position based on the detection value of the speed sensor 66. In this manner, the detection system 60 including the steering sensor 68 and the speed sensor 66 can detect the relative position of the transport machine 1 with respect to the reference position based on dead reckoning navigation. In other words, in the present embodiment, the speed sensor 66 and the steering sensor 68 function as relative position detection devices to detect the relative position with respect to the reference position based on dead reckoning navigation. The processing device 51, based on the detection value of the steering sensor 68 and the detection value of the speed sensor 66, controls the traveling device 5 such that the transport machine 1 travels according to the predetermined route CS. Alternatively, orientation (orientation variation) of the transport machine 1 may be detected by a gyro sensor arranged on the transport machine 1.

After the relative position of the transport machine 1 with respect to the reference position has been detected with dead reckoning navigation, the processing device 51 may correct the result of detection based on information regarding the absolute position of the transport machine 1 in the drift DR obtained by using one or both of the result of detection by the range sensor 61 and the result of detection by the reading device 65. Specifically, in a case where the traveling distance of the transport machine 1 is increased, detection errors of one or both of the steering sensor 68 and the speed sensor 66 have been accumulated. Accordingly, an error might occur between the position that has been estimated (estimated position) and the actual position. This might cause the transport machine 1 to deviate from the route CS during traveling. In the present embodiment, the configuration may be such that the processing device 51 controls the traveling device 5 while correcting the position of the transport machine 1 that has been derived (estimated) with dead reckoning navigation, by using information regarding the absolute position of the transport machine 1 obtained from the results of detection by at least one of the range sensor 61 and the reading device 65. The processing device 51, based on a detection value of the steering sensor 68, a detection value of the speed sensor 66, and information regarding the absolute position of the transport machine 1, calculates a control amount regarding traveling of the transport machine 1, including a correction amount of the position of the transport machine 1, such that the transport machine 1 travels according to the route CS. The processing device 51, based on the calculated correction amount and control amount, controls the traveling device 5 such that the transport machine 1 travels according to the route CS.

Figure 15:
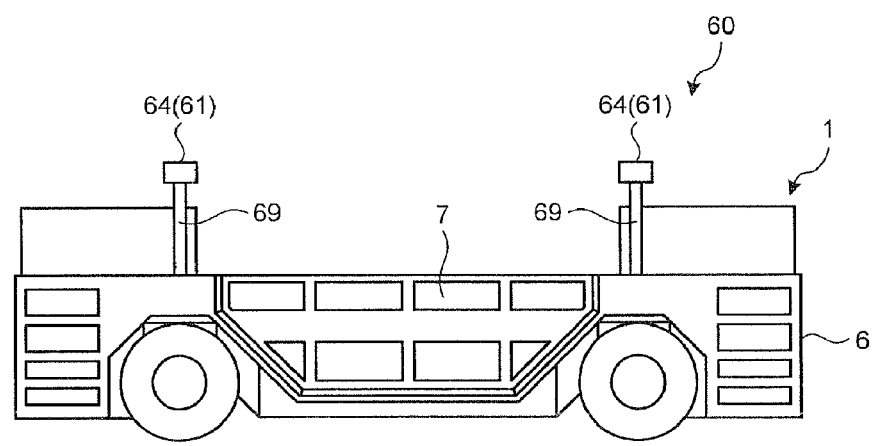
FIG. 15 is a schematic diagram illustrating an exemplary detection system according to the present embodiment.

FIG. 15 is a schematic diagram illustrating an exemplary detection system 60 mounted on the transport machine 1. As illustrated in FIG. 15, the imaging device (load detection device, form detection device) 64 is supported by the vehicle body 6 via a support device 69. The imaging device 64 is arranged at a position where the form of the load on the vessel 7 is detectable. Note that as described above, in place of the imaging device 64, or together with the imaging device 64, the range sensor 61 including at least one of a laser scanner and a three-dimensional distance sensor can be used to detect the form of the load on the vessel 7. That is, the range sensor 61 may be supported by the support device 69.

The imaging device 64 may be arranged at a predetermine position on the vehicle body 6, where an optical image of the loading machine 2 is obtainable. Alternatively, the imaging device 64 may be arranged at a predetermined position on the vehicle body 6, where an optical image of the wall surface of the drift DR (three-dimensional form data) is obtainable. In this case, the imaging device 64 functions as at least one of a loading machine detection device (first detection device) that detects the loading machine 2 and a second loading machine that detects the drift DR (tunnel R).

Figure 16:
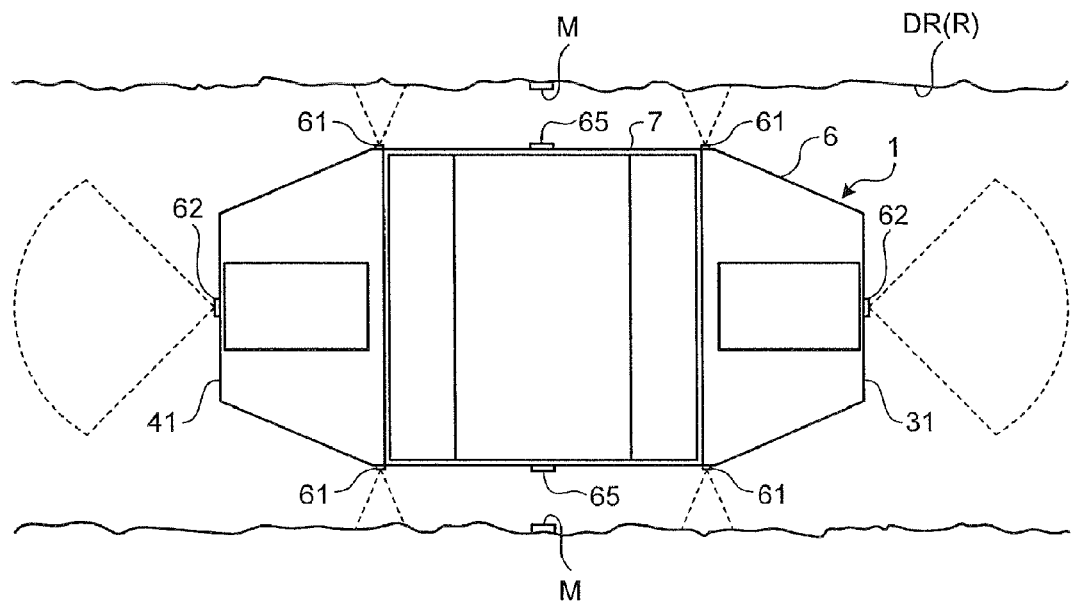
FIG. 16 is a schematic diagram illustrating an exemplary detection system according to the present embodiment.

FIG. 16 is a schematic diagram illustrating an exemplary detection system 60 mounted on the transport machine 1. As illustrated in FIG. 16, the non-contact sensor 62 to detect an obstacle may be arranged at one or both of the front surface 31 and the rear surface 41, of the vehicle body 6.

A range sensor (second detection device, position detection device, loading machine detection device, and first detection device) 61 that can detect at least one of shape data of the loading machine 2, shape data of a wall surface of the drift DR, the relative position with respect to the loading machine 2, and the relative position with respect to the wall surface of the drift DR is arranged at a predetermined position of the vehicle body 6. As an example illustrated in FIG. 16, the range sensor 61 is arranged on a side surface of the vehicle body 6 such that at least one of the shape data of the wall surface of the drift DR, and the relative position with respect to the wall surface of the drift DR is detectable.

The range sensor 61 may be arranged at least on a portion of the top surface, the side surface, the front surface, and the rear surface, of the vehicle body 6, such that at least one of the shape data of the loading machine 2, and the relative position of the loading machine 2 is detectable.

The reading device (position detection device, second detection device) 65 is arranged at a predetermined position of the vehicle body 6, such as a side surface of the vehicle body 6, such that the mark M arranged on the wall surface of the drift DR is detectable.

<Management Device>

Figure 17:
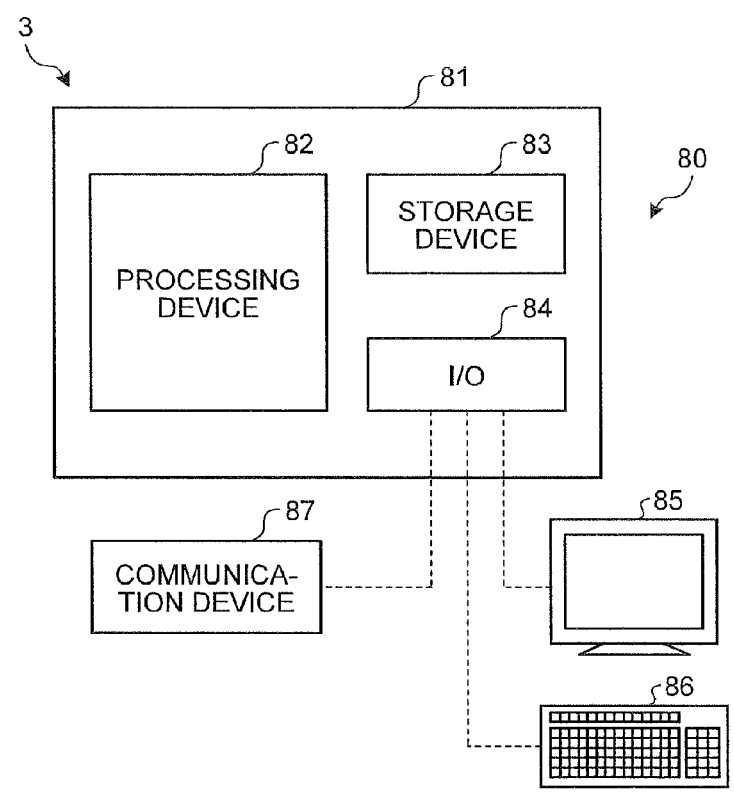
FIG. 17 is a block diagram illustrating an exemplary management device according to the present embodiment.

Next, a management device 80 arranged in the management facility 3 will be described. FIG. 17 is a block diagram illustrating an exemplary management device 80 according to the present embodiment. As illustrated in FIG. 17, the management device 80 includes a computer system 81, a display device 85, an input device 86, and a communication device 87.

The computer system 81 includes a processing device 82, a storage device 83, and an input/output unit 84. Each of the display device 85, the input device 86, and the communication device 87 is connected with the computer system 81 via the input/output unit 84. The input/output unit 84 is served for input/output (interface) of information with at least one of the processing device 82, the display device 85, the input device 86, and the communication device 87.

The processing device 82 includes a central processing unit (CPU) and executes various types of processing regarding control of mining machines including the transport machine 1 and the loading machine 2. The processing device 82 processes information regarding the position of the transport machine 1 obtained via the communication system 4. The processing device 82 generates the route CS on which the transport machine 1 travels. The route CS is generated on an absolute position coordinate system. The transport machine 1 travels at least on a portion of the tunnel R according to the route CS generated by the processing device 82.

The storage device 83 includes at least one of random access memory (RAM), read only memory (ROM), flash memory, and a hard disk drive, and stores various types of information regarding control of mining machines. The display device 85 includes, for example, a flat panel display such as a liquid crystal display and can display information regarding a position of the mining machine. The input device 86 includes at least one of a keyboard, a touch panel, a mouse, and an operation switch. When operated, the input device 86 generates an operation signal and inputs it to the processing device 82.

The communication system 4 includes the communication device 87 arranged in the management facility 3. The communication device 87 is connected with the repeater 4A by a wired connection. The processing device 82 can transmit various types of information such as information regarding the route CS from the communication device 87 to the transport machine 1. At least one of positional information of the transport machine 1 and information regarding the state of the load detected by the detection system 60 is received via the communication device 87 and stored in the storage device 83.

<Operation of Transport Machine>

Figure 18:
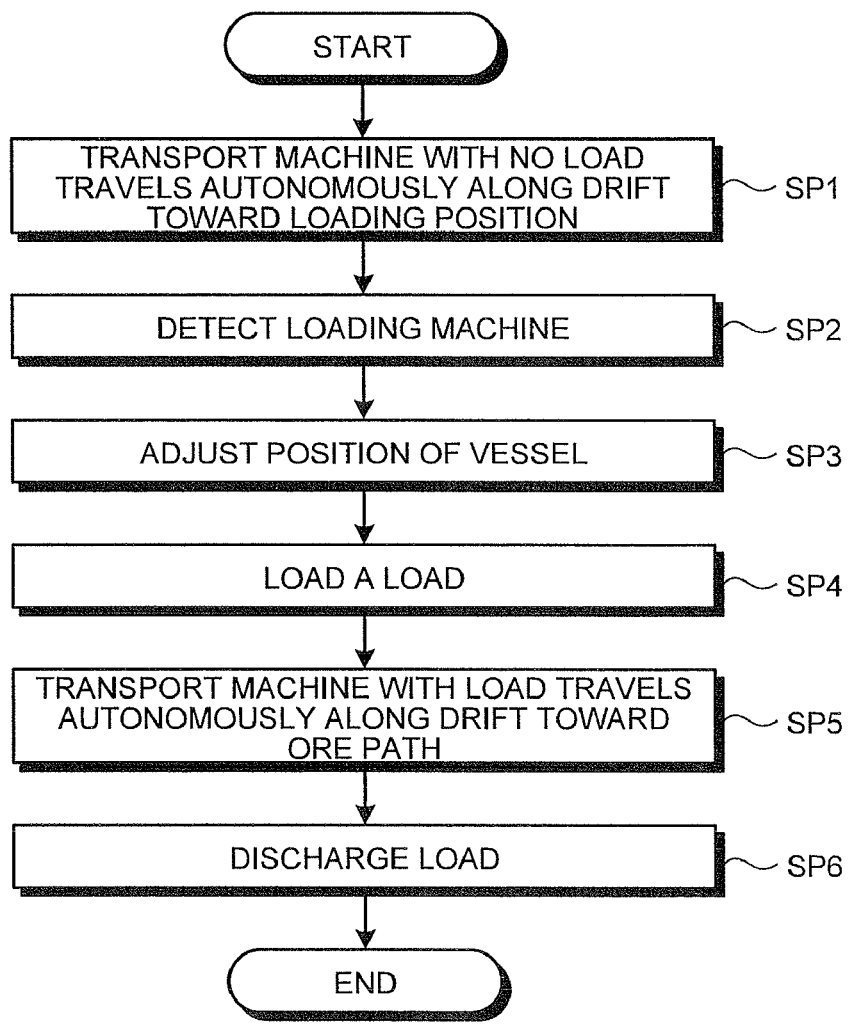
FIG. 18 is a flowchart illustrating exemplary operation of the transport machine according to the present embodiment.

Next, exemplary operation of the transport machine 1 will be described with reference to FIG. 18. FIG. 18 is a flowchart illustrating exemplary operation of the transport machine 1 according to the present embodiment. The transport machine 1 with no load (empty load state) travels along the drift DR toward the loading position LP in order to pick the load (step SP1). During traveling along the drift DR, the center of the vessel 7 and the center of the vehicle body 6 overlap with each other with respect to the X-axis direction. Accordingly, the vessel 7 is not lifted up. Information regarding the route CS is transmitted from the management device 80 to the transport machine 1 via the communication system 4. The transmitted information is stored in the storage device 52 of the transport machine 1. The route CS is a route based on the absolute position. The processing device 51 of the transport machine 1 controls the traveling device 5 such that the transport machine 1 travels along the drift DR according to the route CS generated by the management device 80. The transport machine 1 autonomously travels along the drift DR toward the loading position LP such that the vessel 7 is arranged at the loading position LP, namely, the target position.

As described above, the processing device 51 can derive an absolute position of the transport machine 1 on the drift DR based on at least one of the result of detection by the range sensor 61 and the result of detection by the reading device 65, and based on the storage information of the storage device 52 The processing device 51 controls the traveling device 5 such that the transport machine 1 travels along the drift DR according to the route CS toward the loading position LP. The processing device 51 controls the traveling device 5 in the drift DR toward the loading position LP such that the vessel 7 is arranged at the loading position LP based on at least one of the result of detection by the range sensor 61 and the result of detection by the reading device 65.

The range sensor 61 can detect the relative position with respect to the wall surface of the drift DR. The processing device 51, based on the result of detection by the range sensor 61, controls the traveling device 5 such that the transport machine 1 travels along the wall surface of the drift DR. The processing device 51 controls the traveling device 5, for example, to prevent the transport machine 1 from contacting the wall surface of the drift DR during traveling on the drift DR.

Note that, in the drift DR, the transport machine 1 may contact the wall surface of the drift DR. For example, in a case where the width of the drift DR (road width) is small, or the transport machine 1 turns a corner of the drift DR, the transport machine 1 may travel while contacting the wall surface of the drift DR. Alternatively, a guide member (e.g. guide rail) may be provided at a corner of the drift DR and a guided portion (e.g. roller) to be guided by the guide member may be provided on the transport machine 1. With this configuration, it is possible to allow the transport machine 1 to turn the corner of the drift DR while allowing the guided portion to contact the guide member.

In the present embodiment, the transport machine 1 moves along the drift DR in the $+Y_0$ direction to enter the loading position LP. After the transport machine 1 reaches the vicinity of the loading position LP, the processing device 51 controls the traveling device 5 to stop the transport machine 1. After the transport machine 1 reaches the vicinity of the loading position LP, the processing device 51 detects the loading machine 2 by using the range sensor 61 (step SP2). The processing device 51 obtains form data of the loading machine 2 by using the range sensor 61, and at the same time, detects the relative positions of the transport machine 1 and the loading machine 2. The processing device 51, based on the result of detection by the range sensor 61, controls the position of the vessel 7 such that the vessel 7 is arranged at the loading position LP of the loading machine 2.

By obtaining the form data of the loading machine 2 and detecting the relative position with respect to the loading machine 2, it is possible for the processing device 51 to arrange the vessel 7 to a position suitable for loading operation. The processing device 51, based on the result of detection by the range sensor 61, arranges the vessel 7 at the loading position LP so as to prevent the transport machine 1 including the vessel 7 and the loading machine 2 from coming in contact with each other.

Figure 19:
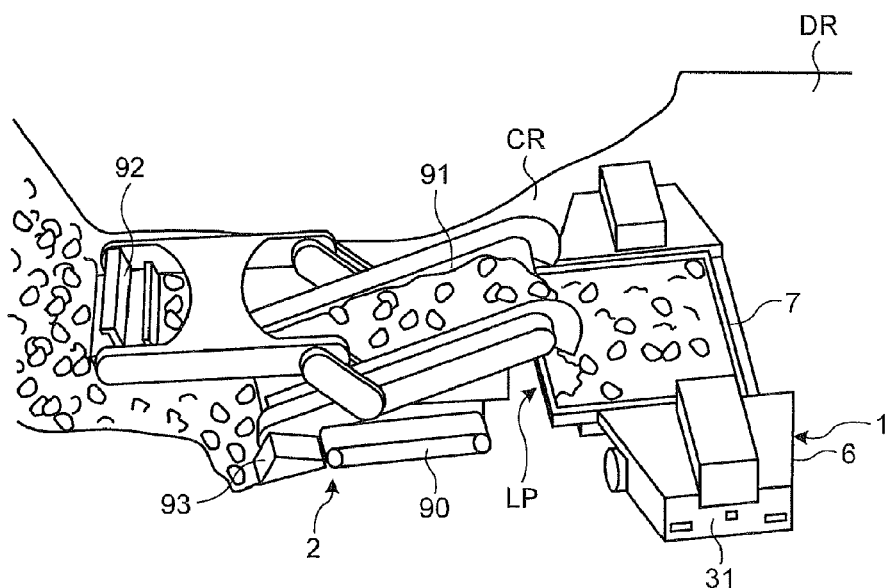
FIG. 19 is a perspective view of an exemplary state in which a load is being loaded onto a transport machine from a loading machine according to the present embodiment.
Figure 20:
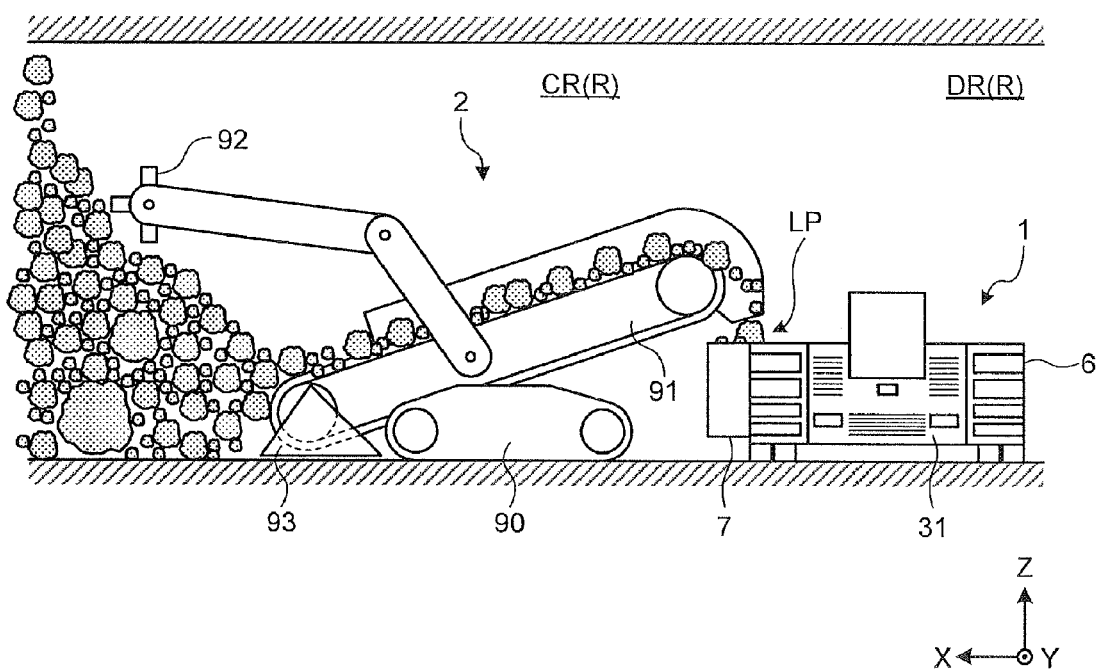
FIG. 20 is a side view of an exemplary state in which a load is being loaded onto a transport machine from the loading machine according to the present embodiment.

FIG. 19 is a perspective view of an exemplary state in which a load is being loaded onto the vessel 7 by the loading machine 2. FIG. 20 is a side view. In FIGS. 19 and 20, the loading machine 2 includes an undercarriage 90, a feeder device 91, a draw-in device 92, and a penetrating member 93. The undercarriage 90 includes a crawler. The feeder device 91 is supported by the undercarriage 90 and can supply a load, namely, ore, to the vessel 7. The draw-in device 92 draws the load into the feeder device 91. The penetrating member 93 penetrates into a mine.

The feeder device 91 includes a tilted conveyer. The feeder device 91 moves the load from a front section to a rear section of the feeder device 91. In the present embodiment, the front section of the feeder device 91 is arranged below the rear section of the feeder device 91. The load drawn into the front section (lower portion) of the feeder device 91 is raised by the feeder device 91 and supplied to the vessel 7 from the rear section (supply unit, upper portion) of the feeder device 91. In the present embodiment, the loading position LP includes a position below the supply unit of the feeder device 91.

In the present embodiment, based on the result of detection by the range sensor 61, the traveling device 5 is controlled to prevent the transport machine 1 and the loading machine 2 from coming in contact with each other, and at the same time, at least a portion of the transport machine 1 enters below the supply unit of the feeder device 91. In the present embodiment, when the vessel 7 enters the loading position LP, the upper surface 34A and the upper surface 44A, which are arranged near the feeder device 91, are arranged in a low position. Accordingly, it is possible to suppress contact of the feeder device 91 and the vehicle body 6.

As illustrated in FIGS. 19 and 20, the processing device 51 adjusts the position of the vessel 7 such that the vessel 7 is arranged below the supply unit of the feeder device 91 (step SP3). In the present embodiment, the vessel 7 is moved by the slide mechanism 18 such that, when the load is loaded onto the vessel 7, at least a portion of the vessel 7 is arranged outside the vehicle body 6. In the present embodiment, with respect to the transport machine 1 that moves along the drift DR in the $+Y_0$ direction, the loading machine 2 is arranged on the +X side. The processing device 51 detects relative positions of the transport machine 1 and the loading machine 2 by using the range sensor 61. Based on the result of detection, the processing device 51 controls the slide mechanism 18 such that the vessel 7 is arranged below the supply unit of the feeder device 91 arranged on the +X side. The processing device 51 controls the slide mechanism 18 based on the result of detection by the range sensor 61 so as to move the vessel 7 in the +X direction and adjust the position of the vessel 7 with respect to the loading machine 2. In the present embodiment, the processing device 51, in a state where the position of the vehicle body 6 is fixed, moves the vessel 7 by using the slide mechanism 18 so as to arrange the vessel 7 at the loading position LP.

Note that in a case where the processing device 51 adjusts the position of the vessel 7 such that the vessel 7 is arranged at the loading position LP, the processing device 51 may adjust the position of the vessel 7 by controlling the traveling device 5 to move the vehicle body 6. Alternatively, in order to arrange the vessel 7 at an optimum position, the processing device 51 may control both the traveling device 5 and the slide mechanism 18 to move the vehicle body 6 with respect to the road surface, and at the same time, may move the vessel 7 with respect to the vehicle body 6.

In a state where the vessel 7 is arranged at an optimum position with respect to the feeder device 91, a load is supplied from the feeder device 91 to the vessel 7. With this operation, the load is loaded from the loading machine 2 to the vessel 7 (step SP4). The position of the vessel 7 is adjusted, and thus, it is possible to suppress the load leakage (load dropping).

Figure 21:
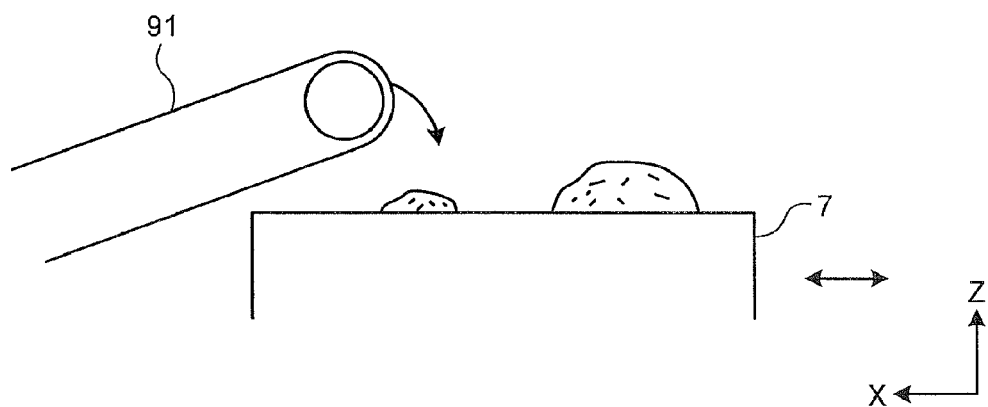
FIG. 21 is a schematic diagram illustrating an exemplary state in which a load is being loaded onto a vessel from the loading machine according to the present embodiment.

FIG. 21 is a schematic diagram illustrating an exemplary state where the load is loaded from the feeder device 91 onto the vessel 7. As illustrated in FIG. 21, it might be possible that the ore supplied from the feeder device 91 is piled on a portion of the vessel 7, causing an uneven load on the vessel 7. As described with reference to FIGS. 14 and 15, in the present embodiment, the transport machine 1 includes the imaging device 64 capable of detecting a state of the load of the vessel 7. In the present embodiment, based on the result of detection by the imaging device 64, the processing device 51 can control the slide mechanism 18 to adjust the position of the vessel 7. The imaging device 64 can detect the form of the load on the vessel 7. When the processing device 51 determines that the load is going to be piled unevenly on the vessel 7 based on the result of detection by the imaging device 64, the processing device 51 adjusts the position of the vessel 7 with respect to the feeder device 91 of the loading machine 2 by moving the vessel 7 in the X-axis direction so as to reduce the degree of unevenness. As in an example illustrated in FIG. 21, the load is piled unevenly on an −X-side end of the vessel 7. The processing device 51 moves the vessel 7 in the −X direction so as to improve the uneven load. With this configuration, the load is supplied from the feeder device 91 to a +X-side end of the vessel 7, making it possible to suppress the uneven load on the vessel 7.

Based on the result of detection by the weight sensor 63 capable of detecting the weight of the vessel 7, the position of the vessel 7 with respect to the loading machine 2 may be adjusted by moving the vessel 7 in the X-axis direction with the slide mechanism 19. For example, the vessel 7 may be moved by a predetermined distance in the X-axis direction each time the weight sensor 63 detects an increase in the predetermined weight. When the relationship between the weight of the vessel 7 and the form of the load (appearance of load) that corresponds to the weight is known, the processing device 51 may move the vessel 7, based on the result of detection by the weight sensor 63, so as to adjust the appearance of the load to be an appropriate shape.

Note that, for example, in a case where the weight sensor 63 capable of detecting the weight of the vessel 7 can detect the state of the load of the vessel 7, the vessel 7 may be moved in the X-axis direction by the slide mechanism 18 based on the result of detection by the weight sensor 63. For example, in a case where the weight sensor 63 can detect uneven loading on the vessel 7 due to an uneven load, the processing device 51 may move the vessel 7 in the X-axis direction so as to improve the unevenness.

The processing device 51 may control the slide mechanism 18 so as to reciprocate (rock) the vessel 7 with respect to the X-axis direction. In a case, for example, where the load is piled unevenly on the vessel 7, or piled up too high on the vessel 7, it is possible to level the load by reciprocating the vessel 7. By leveling the load, it is possible to achieve a higher full-capacity rate of the load on the vessel 7.

The processing device 51 may determine amplitude of reciprocation of the vessel 7 based on the result of detection by the imaging device 64. For example, in a case where it is determined that the load is piled up too high, based on the result of detection by the image device 64, the processing device 51 may reciprocate the vessel 7 with greater amplitude. In a case where it is determined that the load is piled up in a plurality of locations, based on the result of detection by the image device 64, the processing device 51 may reciprocate the vessel 7 with smaller amplitude. When increasing the amplitude, the processing device 51 may decrease the movement speed of the vessel 7. When decreasing the amplitude, the processing device 51 may increase the movement speed of the vessel 7. With this operation, it is possible to level the load efficiently.

The processing device 51 may determine whether to reciprocate the vessel 7 or may determine one or both of amplitude and speed of reciprocation based on the result of detection by the imaging device 64 that detects the form of the load of the vessel 7 and based on the result of detection by the weight sensor 63 that detects the weight of the vessel 7. For example, in a case where it is determined that the vessel 7 is full of load based on the result of detection by the imaging device 64 and at the same time, it is determined that the vessel 7 is not yet full of load based on the result of detection by the weight sensor 63, it is estimated that there are numerous gaps between the ores loaded on the vessel 7. When the processing device 51 determines, based on the result of detection by the imaging device 64 and the result of detection by the weight sensor 63, that there are numerous gaps between the ores, the processing device 51 reciprocates the vessel 7 by controlling the slide mechanism 18. With this configuration, it is possible to reduce the gaps by leveling the load and increase the full-capacity rate.

Operation of reciprocating the vessel 7 may be executed in parallel with at least part of operation of supplying the load from the feeder device 91 to the vessel 7. In other words, the slide mechanism 18 may reciprocate the vessel 7 during a loading operation period in which the load is loaded onto the vessel 7. Note that the operation of reciprocating the vessel 7 may be executed after the load has been supplied from the feeder device 91 to the vessel 7. In short, the slide mechanism 18 may reciprocate the vessel 7 during a period after completion of loading operation for the vessel 7.

After completion of the loading operation, the transport machine 1 with load (in a loaded state) travels along the drift DR toward the ore path OP so as to discharge the load (step SP5). The transport machine 1 that has started from the loading position LP moves along the drift DR in the +Y$_0$ direction. During traveling along the drift DR, the center of the vessel 7 and the center of the vehicle body 6 overlap with each other with respect to the X-axis direction. Accordingly, the vessel 7 is not lifted up. The processing device 51 controls the traveling device 5 such that the transport machine 1 travels along the drift DR according to the route CS generated by the management device 80. The transport machine 1 autonomously travels along the drift DR toward the ore path OP such that the vessel 7 is arranged at the ore path OP, namely, the target position.

In a period of moving toward the ore path OP, the processing device 51 derives the absolute position of the transport machine 1 at the drift DR based on the result of detection by at least one of the range sensor 61 and the reading device 65, and based on the information stored in the storage device 52. The processing device 51, then, controls the traveling device 5 such that the transport machine 1 travels along the drift DR according to the route CS toward the ore path OP. The processing device 51, based on at least one of the result of detection by the range sensor 61 and the result of detection by the reading device 65, controls the traveling device 5 at the drift DR toward the ore path OP such that the vessel 7 is arranged at the ore path OP. The processing device 51, based on the result of detection by the range sensor 61, controls the traveling device 5 such that the transport machine 1 travels along the drift DR. The processing device 51 controls the traveling device 5, for example, to prevent the transport machine 1 from contacting the wall surface of the drift DR during traveling along the drift DR.

Figure 22:
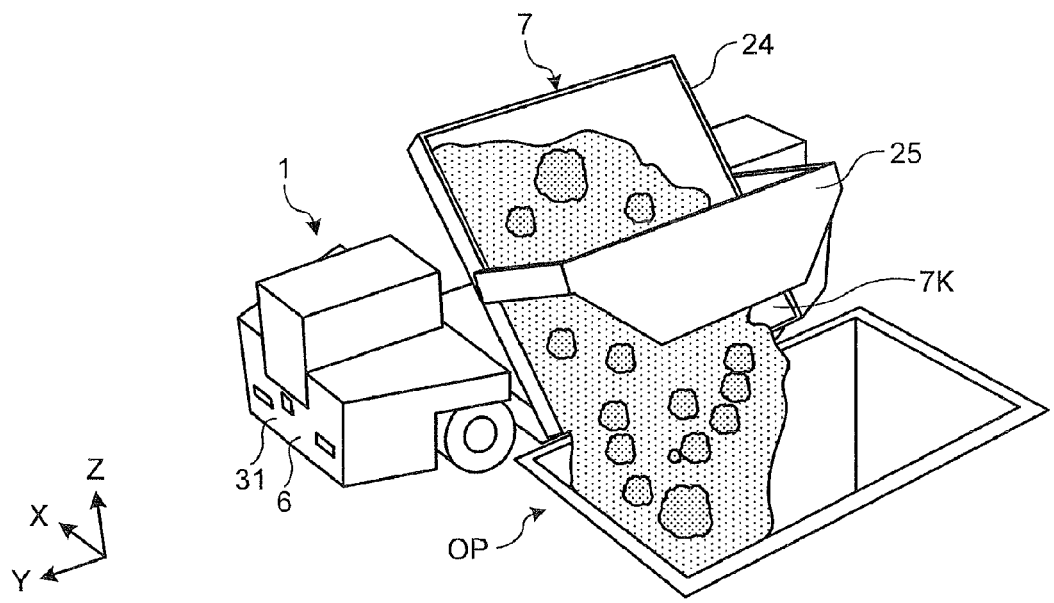
FIG. 22 is a diagram illustrating an exemplary state in which a load is being discharged from the transport machine according to the present embodiment.

FIG. 22 is a diagram illustrating an exemplary state in which a load is being discharged from the vessel 7 at the ore path OP. After the transport machine 1 reaches the ore path OP, the processing device 51 lifts up the vessel 7 by operating the side dump mechanism 19. With this operation, as illustrated in FIG. 22, the side gate 25 pivots along with rising operation of the vessel 7, so as to form the opening 7K between the vessel main body 24 and the side gate 25. The load on the vessel 7 is discharged from the vessel 7 via the opening 7K (step SP6). In an example illustrated in FIG. 22, the vessel 7 is lifted up such that the load is discharged onto the −X side of the vehicle body 6.

When the load is discharged from the vessel 7, the processing device 51 may operate the slide mechanism 18 so as to move the vessel 6 such that at least a portion of the vessel 7 is arranged outside the vehicle body 6. For example, the processing device 51 may move the vessel 7 in the −X direction by operating the slide mechanism 18, and thereafter, may lift up the vessel 7 by operating the side dump mechanism 19. The processing device 51 may lift up the vessel 7 while moving the vessel 7 in the −X direction.

After completion of discharging operation of the load, the transport machine 1 with no load starts traveling toward the loading position LP for loading operation. The transport machine 1 repeats the processing described hereinabove.

In the examples illustrated in FIGS. 19 and 20, the load is loaded from the loading machine 2 arranged at the crosscut CR on the +X side onto the transport machine 1 that travels along the drift DR in the $+Y_0$ direction. As described with reference to FIG. 3, or the like, the load may be loaded onto the transport machine 1 from the loading machine 2 arranged at the crosscut CR on the −X side with respect to the transport machine 1. For example, the processing device 51 may detect relative positions of the transport machine 1 and the loading machine 2, which is arranged on the −X side with respect to the transport machine 1 by using the range sensor 61 such that the vessel 7 is arranged at the loading position LP arranged on the −X side with respect to the transport machine 1 traveling along the drift DR in the $+Y_0$ direction. Based on the result of detection, the processing device 51 may adjust the position of the vessel 7 with respect to the loading machine 2 by controlling the slide mechanism 18 to move the vessel 7 in the −X direction such that the vessel 7 is arranged below the supply unit of the feeder device 91 of the loading machine 2. Also in this case, the upper surface 34B and the upper surface 44B, to be arranged near the feeder device 91 when the vessel 7 enters the loading position LP, are arranged at low positions. Accordingly, it is possible to suppress a state where the feeder device 91 and the vehicle body 6 come in contact with each other. In the present embodiment, the transport machine 1 is left/right symmetrical. Accordingly, each of loading operation from the +X side and loading operation from the −X side is performed smoothly onto the transport machine 1. With this configuration, when the loading position LP is determined on any one side of the two, with respect to the moving direction of the transport machine 1, loading operation is executed from the one determined side smoothly.

In the present embodiment, an example has been described in which the transport machine 1 traveling along the drift DR in the +Y direction enters the loading position LP while moving in the $+Y_0$ direction, thereafter, loading operation is performed onto the transport machine 1, thereafter, the transport machine 1 moves from the loading position LP in the $+Y_0$ direction. Needless to say, the transport machine 1 moving along the drift DR in the $-Y_0$ direction may enter the loading position LP while moving in the $-Y_0$ direction, thereafter, loading operation may be performed onto the transport machine 1, thereafter, the transport machine 1 may move from the loading position LP in the $-Y_0$ direction. In a case where the transport machine 1 moves in the $-Y_0$ direction, the rear section 6B may function as a front section and the rear traveling device 5B may function as a front traveling device. In addition, the loading position LP at that time may be determined to be on the +X side or on the −X side of the transport machine 1. In a case where the loading position LP is determined to be on the +X side, the vessel 7 may slide to the +X side. In a case where the loading position LP is determined to be on the −X side, the vessel 7 may slide to the −X side. Alternatively, the transport machine 1 moving along the drift DR in the $+Y_0$ (or $-Y_0$) direction may enter the loading position LP while moving in the $+Y_0$ (or $-Y_0$) $-Y_0$ direction, thereafter, loading operation may be performed onto the transport machine 1, thereafter, the transport machine 1 may move from the loading position LP in the $-Y_0$ (or $+Y_1$) direction. In short, the moving direction of the transport machine 1 may be switched between a case of entering the loading position LP to execute loading operation and a case of starting from the loading position LP after executing the loading operation. In the present embodiment, the transport machine 1 is front/rear symmetrical, and thus, can travel in any of $+Y_0$ and $-Y_0$ directions smoothly even when the moving direction is switched.

<Obstacle Detection>

As described above, in the present embodiment, the transport machine 1 includes the non-contact sensor 62 that detects an obstacle. In a case where the non-contact sensor 62 detects an obstacle existing on the drift DR when the transport machine 1 is traveling along the drift DR, the processing device 51 outputs a result of detection by the non-contact sensor 62 to the management device 80 of the management facility 3 via the communication system 4. The management device 80 may create, for example, the route CS so as to avoid the obstacle.

In a case where the non-contact sensor 62 detects an obstacle in front of the transport machine 1, the processing device 51 may control the traveling device 5 to prevent the transport machine 1 and the obstacle from coming in contact with each other. Specifically, the processing device 51 may cause the transport machine 1 to stop traveling, to move reversely, or to travel while avoiding the obstacle.

Figure 23:
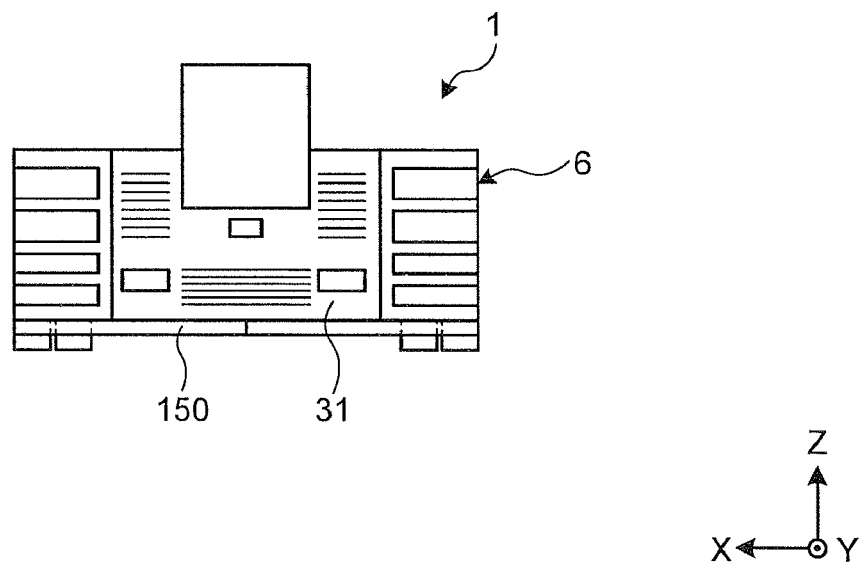
FIG. 23 is a front view of an exemplary transport machine according to the present embodiment.

FIG. 23 is another example of the transport machine 1. In FIG. 23, the transport machine 1 includes a bumper 150 that clears an obstacle or a foreign substance on the road. In a case where the non-contact sensor 62 detects an obstacle in front of the transport machine 1, the transport machine 1 may continue traveling while driving away the obstacle by using the bumper 150.

<Battery Replacement>

Figure 24:
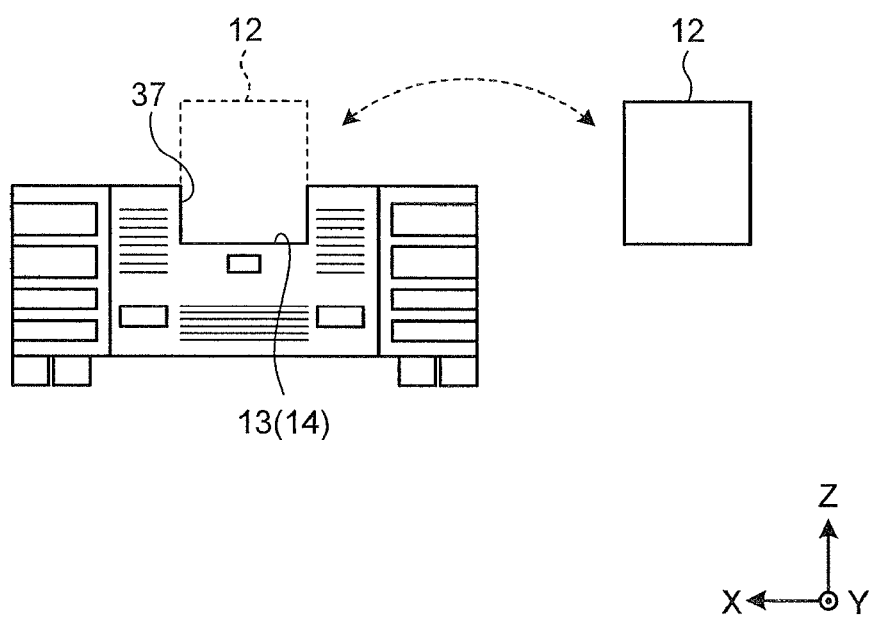
FIG. 24 is a schematic diagram illustrating exemplary operation of replacing a device according to the present embodiment.

As described above, at least a portion of the transport machine 1 operates on power supplied from the battery 12. FIG. 24 illustrates an example in which the battery 12 is released from the holding section 13 and the holding section 14. As illustrated in FIG. 24, the battery 12 is replaceable. On a portion of the drift DR, there is provided a replacement station EX (refer to FIG. 2) at which the battery 12 is replaced. The holding section 13 and the holding section 14 removably hold the battery 12. When a remaining capacity of the battery 12 is lowered, the transport machine 1 can move to the replacement station EX and replace the battery 12. In the present embodiment, the battery 12 is replaceable by sliding the battery 12 in a front/rear direction with respect to the recess 37. A similar method is applicable to the recess 47.

In the present embodiment, the device 12 that is removably held by the holding section 13 and the holding section 14 is a battery. The device 12 is not limited to a battery. For example, an electronic device storing a program regarding traveling may be removably held by the holding section 13 and the holding section 14. In the present embodiment, the traveling device 5 operates on electric power. However, in a case where the traveling device 5 travels on a fuel, a container in which the fuel is contained may be removably held by the holding section 13 and the holding section 14. The device 12, in any form as above, is replaceable at the replacement station EX.

<Management Using Management System>

In the above-described embodiment, an example has been described in which the transport machine 1 autonomously travels by using the detection system 60 including the range sensor 61 mounted on the transport machine 1. For example, the transport machine 1 may be controlled by using a management system 100 including a detection system 602 and a detection system 60D. The detection system 602 is arranged on the loading machine 2. The detection system 60D is arranged at the drift DR.

Figure 25:
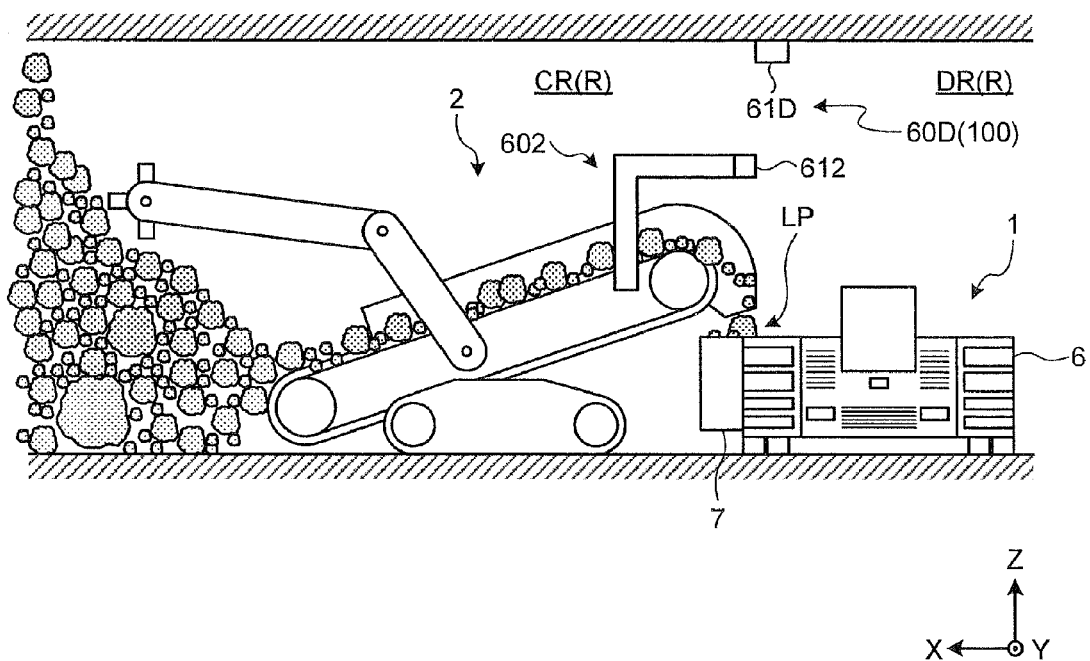
FIG. 25 is a schematic diagram illustrating exemplary processing on the detection system according to the present embodiment.

FIG. 25 is a diagram illustrating an exemplary range sensor 612 of the detection system 602 mounted on the loading machine 2, and an exemplary range sensor 61D of the detection system 60D arranged in the tunnel R. For example, in the above-described embodiment, relative positions of the transport machine 1 and the loading machine 2 are detected by the range sensor 61 arranged on the transport machine 1. The relative positions of the transport machine 1 and the loading machine 2 may be detected by the range sensor (position detection device) 612 provided on the loading machine 2. A result of detection on the relative positions may be transmitted from the loading machine 2 to the transport machine 1, or may be transmitted from the loading machine 2 to the transport machine 1 via the management device 80. The processing device 51 of the transport machine 1 may adjust the position of the vessel 7 such that the vessel 7 is arranged at the loading position LP of the loading machine 2, based on a result of detection by of the range sensor 612. The processing device 51 may adjust the position of the vessel 7 by using the slide mechanism 18, or by using the traveling device 5. Alternatively, the management device 80, based on the result of detection by the range sensor 612, may transmit a command signal to the support device 17 and the traveling device 5 such that the vessel 7 is arranged at the loading position LP. In short, the management device 80 may remotely operate the transport machine 1.

Meanwhile, the range sensor 61D may be arranged at a predetermined position of one or both of the drift DR and the crosscut CR. When the range sensor 61D is arranged at a position where the transport machine 1 and the loading machine 2 to be arranged at the loading position LP are detectable, it is possible to detect the relative positions of the transport machine 1 and the loading machine 2. A result of detection by the range sensor 61D may be transmitted to the transport machine 1 via the management device 80.

In the above-described embodiment, the relative positions of the transport machine 1 and the wall surface of the drift DR, or the absolute position of the transport machine 1, are detected by the detection system 60 including the range sensor 61 and the reading device 65, arranged on the transport machine 1. For example, the drift DR may be provided with a plurality of reading devices that can read identifiers arranged on the transport machine 1. The absolute position of the transport machine 1 may be obtained based on a result of detection by the reading device. In this case, the reading device functions as a position detection device that detects the position of the transport machine 1 traveling on the drift DR (tunnel R). Moreover, there may be provided, on the drift DR, a plurality of range sensors 61D capable of detecting the relative position with respect to the transport machine 1. The traveling device 5 of the transport machine 1 may be controlled on the drift DR toward a target position (loading position LP, ore path OP, or the like) such that the vessel 7 of the transport machine 1 is arranged at the target position, based on a result of detection by the detection system 60D provided on the drift DR. The traveling device 5 may be controlled by the management device 80. Specifically, based on the result of detection by the detection system 60D arranged on the drift DR, the management device 80 may transmit a command signal for moving the transport machine 1 to the target position, and the traveling device 5 may travel based on the command signal. In short, the management device 80 may remotely operate the transport machine 1.

Moreover, the imaging device (load detection device, form detection device) capable of detecting a state of the load on the vessel 7 may be mounted on the loading machine 2 or arranged at a predetermined position on the drift DR. Based on a result of detection by the imaging device, the position of the vessel 7 may be adjusted, a slide movement amount of the vessel 7 may be adjusted, and the vessel 7 may be reciprocated in the X-axis direction. Meanwhile, loading conditions for the loading machine 2 may be controlled based on a state of load on the vessel 7, detected by using at least one of the imaging device arranged in the transport machine 1, the imaging device arranged on the loading machine 2, and the imaging device arranged at a predetermined position of the drift DR. The loading conditions for the loading machine 2 include the amount of supply of load per a unit of time by the feeder device 91 (feeder speed), and the position of the loading machine 2 with respect to the vessel 7.

Alternatively, loading conditions for the loading machine 2 may be controlled based on at least one of the result of detection by the imaging device, capable of detecting a state of the load of the vessel 7, arranged on at least one of the transport machine 1, the loading machine 2, and the drift DR, and the result of detection by the weight sensor capable of detecting the weight of the vessel V. In this case, loading conditions for the loading machine 2 include at least one of the feeder speed of the feeder device 91 and a loading amount (total weight) of the load loaded onto the vessel 7 by the loading machine 2.

<Summing-Up>

As described above, according to the present embodiment, the transport machine 1 has a form and structure that are substantially front/rear symmetrical. Accordingly, the transport machine 1 can smoothly travel in any of the directions of the +Y direction, namely, a forward direction of the front section 6A, and the −Y direction, namely, a forward direction of the rear section 6B. In a case where the transport machine is not front/rear symmetrical, for example, there is a possibility that, while the machine can travel in forward direction of the front section, the machine cannot travel smoothly in the forward direction of the rear section. If such a transport machine that is not front/rear symmetrical is going to change the moving direction during traveling in the $+Y_0$ direction, for example, the transport machine might attempt, in the tunnel R, switchback operation (steering wheel operation to change direction) so as to change the moving direction of the front section to the $-Y_0$ direction. Unfortunately, in many cases, however, there is a limitation in a size (width) of the tunnel R. Accordingly, such a switchback operation might be difficult. In the present embodiment, the transport machine 1 is front/rear symmetrical. Therefore, it is possible to move smoothly in any direction without performing such switchback operation.

In the present embodiment, the transport machine 1 is left/right symmetrical. With this configuration, even in a case where the loading position LP and a drawpoint DP are determined to be located on both sides ($+X_0$ side and $-X_0$ side) of the drift DR, loading operation is executable smoothly from both sides.

Meanwhile, in the present embodiment, the vessel 7 is arranged between the front traveling device 5A and the rear traveling device 5B. Accordingly, it is possible to suppress an increase in the height of the transport machine 1. In many cases, the size (height) of the tunnel R has limitation. In the present embodiment, the vehicle-height of the transport machine 1 is suppressed. Accordingly, the transport machine 1 can travel smoothly in a narrow tunnel R.

Meanwhile, in the present embodiment, the front wheel 8 is driven by the front wheel driving device 10, and the rear wheel 9 is driven by the rear wheel driving device 11, that is, a whole-wheel-drive system is employed. Accordingly, the traveling device 5 can move smoothly in the tunnel R. In addition, the front wheel driving device 10 and the rear wheel driving device 11, both of which including the electric motor 16, are arranged at a front and rear of the transport machine 1, respectively. This configuration makes it possible to suppress an increase in the vehicle-height of the transport machine 1 and to arrange a high-power electric motor 16 (160).

In the present embodiment, the support device 17 that supports the vessel 7 is arranged below the upper end of the front wheel 8, and below the upper end of the rear wheel 9. This configuration suppresses an increase in the height of the transport machine 1.

Meanwhile, in the present embodiment, the vessel 7 moves in the X-axis direction by the slide mechanism 18. With this configuration, it is possible, in the narrow tunnel R, to allow the vessel 7 to smoothly enter below the feeder device 91, leading to smooth loading operation. In the tunnel R, which has a height limitation, it is probably difficult to arrange a portion of the vehicle body 6 together with the vessel 7 below the feeder device 91. In the present embodiment, it is possible to slide the vessel 7, and arrange the vessel 7 alone below the feeder device 91. With this configuration, it is possible to allow the feeder device 91 to execute loading operation smoothly even in the narrow tunnel R. In the present embodiment, the vessel 7 is slidable to both the +X side and the −X side. Accordingly, it is possible to position the vessel 7 smoothly with respect to the loading machine 2 to be arranged on each of the +X side and −X side with respect to the transport machine 1.

Meanwhile, in the present embodiment, the support device 17 includes the side dump mechanism 19. The transport machine 1 discharges the load on the vessel 7 using a side-dump system. With this configuration, it is possible to suppress an increase in the height of the transport machine 1.

In the present embodiment, regarding the X-axis direction, an upper surface (first upper surface) 34A and an upper surface (first upper surface) 34B of the front section 6A are arranged below an upper surface (third upper surface) 12D of the battery 12 being at a level between the upper surface 34A and the upper surface 34B. In addition, an upper surface (fourth upper surface) 44A and an upper surface (fifth upper surface) 44B of the rear section 6B are arranged below an upper surface 12D of the battery 12 being at a level between the upper surface 44A and the upper surface 44B. Therefore, for example, when the vessel 7 is arranged below the feeder device 91, at least a portion of the vehicle body 6 is allowed to enter below the supply unit of the feeder device 91 in a state where at least one of the upper surface 34A, the upper surface 34B, the upper surface 44A, and the upper surface 44B are arranged below the supply unit of the feeder device 91. With this configuration, it is possible to arrange the vessel 7 below the feeder device 91 while suppressing contact between the feeder device 91 and the vehicle body 6. In the present embodiment, the upper surface 7A of the vessel 7 is arranged at a same level of the upper surface 34 and the upper surface 44 or below the upper surface 34 and the upper surface 44. With this configuration, it is possible arrange the vessel 7 below the feeder device 91 while suppressing the contact between the feeder device 91 and the vehicle body 6.

Moreover, by positioning the upper surface 34 and the upper surface 44 at a low level, the device 12 that has not been arranged in the front section 6A and the rear section 6B due to capacity shortage can be arranged at a central portion with respect to the X-axis direction. As a result, the transport machine 1 can travel while carrying the necessary device 12.

In the present embodiment, the device 12 is removably held by each of the holding section 13 and the holding section 14. With this configuration, the device 12 is smoothly replaceable. In a case where the device 12 is one of consumables such as a battery, or a renewable device such as a computer program or an electronic device, a configuration in which the device 12 is replaceable allows the transport machine 1 to travel smoothly.

In the present embodiment, the configuration may be such that both the holding section 13 and the holding section 14 removably hold the device 12; or any one of the holding section 13 and the holding section 14 removably holds the device 12 and the other one unremovably holds the device 12.

In the present embodiment, a protection member (battery cover) to protect the battery 12 may be arranged so as to cover the upper surface 34A, the upper surface 12D of the battery 12, and the upper surface 34B. In addition, a bracket for attaching various types of sensors for the detection system 60 may be arranged. In this case, the protection member or the bracket may have a first upper surface of the front section 6A that includes an end of the front section 6A regarding the X-axis direction, a second upper surface of the front section 6B that includes the other end of the front section 6A, and a third upper surface arranged between the first upper surface and the second upper surface, above the first upper surface and the second upper surface. In other words, the first surface and the second upper surfaces may be arranged on a member that is separate from the vehicle body 6. Alternatively, a member including the first upper surface and the second upper surface may be regarded as a portion of the vehicle body 6 (front section 6A). A similar arrangement is applicable to the rear section 6B.

Figure 26:
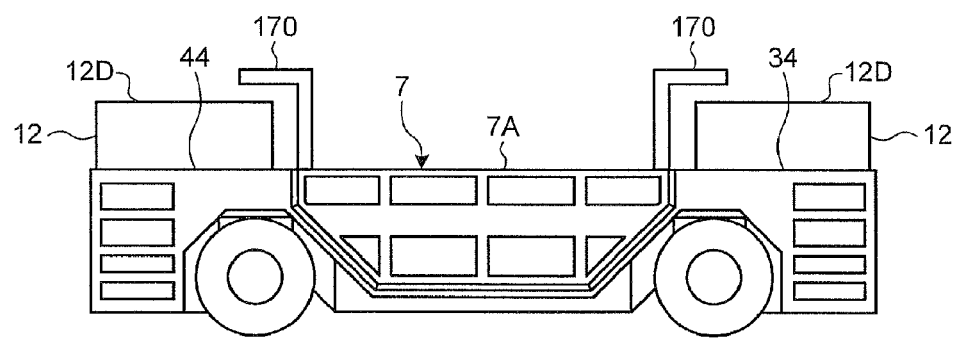
FIG. 26 is a schematic diagram illustrating an exemplary protection member according to the present embodiment.

In the present embodiment, a structure that is different from the vessel 7 may be attached on the vessel 7. FIG. 26 illustrates an example in which, as a member that is different from the vessel 7, a protection member (battery guard) 170 that protects the battery 12 is attached on the vessel 7. The protection member 170 is a member, for example, that prevents the load (ore) from hitting the battery 12 in loading operation of the load onto the vessel 7. As illustrated in FIG. 26, the protection member 170 is arranged above the upper surface 7A of the vessel 7, the upper surface 34 of the front section 6A, the upper surface 44 of the rear section 6B, and the upper surface 12D of the battery 12. In FIG. 26, the upper surface 7A of the vessel 7 may be arranged below or above the upper surface 34 and the upper surface 44, or within a same plane as the upper surface 34 and the upper surface 44. In an example illustrated in FIG. 26, the protection member 170 is a structure different from the vessel 7, but may be regarded as a portion of the vessel 7. In this case, the upper surface of the vessel 7 is arranged above the upper surface 34, the upper surface 44, and the upper surface 12D.

In the present embodiment, the upper surface 34 (upper surface 34A and upper surface 34B) is arranged on the vehicle body 6 (front section 6A), and the upper surface 12D arranged between the upper surface 34A and the upper surface 34B is arranged on the device 12, separate from the vehicle body 6. The vehicle body 6 and the device 12 may be integrated with each other. That is, the upper surface 34 and the upper surface 12D may be an upper surface with a single member. A similar configuration is applicable to the upper surface 44 (upper surface 44A and upper surface 44B) and the upper surface 12D.

In the present embodiment, there is provided the imaging device 64 that detects the form of the load (appearance of load) of the vessel 7. Accordingly, based on the result of detection by the imaging device 64, it is possible to adjust the position of the vessel 7 with respect to the supply unit of the feeder device 91 and to reciprocate the vessel 7 so as to obtain a form of load in a desired shape. With this configuration, it is possible to suppress load collapse or load dropping and to transport the load in a state with the full-capacity rate of the load on the vessel 7 being high.

In the present embodiment, the processing device 51 can travel autonomously based on the result of detection by the detection system 60. The processing device 51 can obtain the relative positions of the transport machine 1 and the loading machine 2 based on the result of detection by the detection system 60 (range sensor 61, or the like). Accordingly, it is possible to arrange the vessel 7 at an optimum position with respect to the loading machine 2. The processing device 51 can obtain the relative positions of the transport machine 1 and the wall surface of the drift DR based on the result of detection by the detection system 60 (range sensor 61, or the like). Accordingly, it is possible to allow the traveling device 5 to travel while suppressing the contact with the drift DR. The processing device 51 can obtain the absolute position of the transport machine 1 based on the result of detection by the detection system 60 (reading device 65, or the like). Accordingly, it is possible to allow the transport machine 1 to smoothly travel autonomously.

In the above-described embodiment, the vessel 7 is provided separate from the vehicle body 6 and is movably supported by the vehicle body 6. The vessel 7 and the vehicle body 6 may be integrally provided.

In the above-described embodiment, an operator may ride on the transport machine 1. The transport machine 1 may be a manned vehicle that travels according to operation by the operator.

The constituents described in the embodiments include constituents that could be easily conceived by a person skilled in the art and constituents that are substantially identical or equivalent in scope. Moreover, it is possible to appropriately combine the constituents described in the embodiments. In some cases, a portion of the constituents is not utilized.

REFERENCE SIGNS LIST

1 TRANSPORT MACHINE
2 LOADING MACHINE
3 MANAGEMENT FACILITY
4 COMMUNICATION SYSTEM
5 TRAVELING DEVICE
5A FRONT TRAVELING DEVICE
5B REAR TRAVELING DEVICE
6 VEHICLE BODY
6A FRONT SECTION
6B REAR SECTION
6C RECESS
6D INTERMEDIATE SECTION
7 VESSEL
8 FRONT WHEEL
9 REAR WHEEL
10 FRONT WHEEL DRIVING DEVICE
11 REAR WHEEL DRIVING DEVICE
12 DEVICE (BATTERY)
12D UPPER SURFACE
13 HOLDING SECTION
14 HOLDING SECTION
17 SUPPORT DEVICE
18 SLIDE MECHANISM
19 SIDE DUMP MECHANISM
34 UPPER SURFACE
34A UPPER SURFACE
34B UPPER SURFACE
44 UPPER SURFACE
44A UPPER SURFACE
44B UPPER SURFACE
51 PROCESSING DEVICE
52 STORAGE DEVICE
53 COMMUNICATION DEVICE
60 DETECTION SYSTEM
61 RANGE SENSOR
62 NON-CONTACT SENSOR
63 WEIGHT SENSOR
64 IMAGING DEVICE
65 READING DEVICE
66 SPEED SENSOR
67 ACCELERATION SENSOR
68 STEERING SENSOR
80 MANAGEMENT DEVICE
82 PROCESSING DEVICE
100 MANAGEMENT SYSTEM
602 DETECTION SYSTEM
60D DETECTION SYSTEM
AX CENTER
CR CROSSCUT (SECOND TUNNEL)
DP DRAWPOINT
DR DRIFT (FIRST TUNNEL)
LP LOADING POSITION
M MARK
OP ORE PATH (DUMPING POSITION)
R TUNNEL

The invention claimed is:

1. A transport machine comprising:
a traveling device;
a vehicle body arranged above the traveling device;
a vessel provided on the vehicle body;
a support device including a slide mechanism configured to move the vessel in a lateral direction with respect to the vehicle body, the lateral direction intersecting with a traveling direction of the traveling device when the transport machine travels straight;
a load detection device configured to detect a state of a load on the vessel, and
a processing device configured to control the slide mechanism based on a result of detection by the load detection device.

2. The transport machine according to claim 1,
wherein, in one or both of cases where the load is loaded onto the vessel and the load is discharged from the vessel, the slide mechanism is configured to move the vessel such that at least a portion of the vessel is arranged outside the vehicle body.

3. The transport machine according to claim 1,
wherein the slide mechanism is capable of moving the vessel such that at least a portion of the vessel is arranged on each of one and other sides of the vehicle body with respect to the lateral direction.

4. The transport machine according to claim 1,
wherein the load detection device is configured to detect an external form of a load of the vessel, and
based on a result of detection by the load detection device, the vessel is configured to move in the lateral direction by the slide mechanism such that a position of the vessel is adjusted with respect to a loading machine that loads a load onto the vessel.

5. The transport machine according to claim 1,
wherein the load detection device is configured to detect a weight of the load of the vessel, and
based on a result of detection by the load detection device, the vessel is configured to move in the lateral direction by the slide mechanism such that a position of the vessel is adjusted with respect to a loading machine that loads a load onto the vessel.

6. The transport machine according to claim 1, comprising:
a loading machine detection device configured to detect a loading machine that loads a load onto the vessel,
wherein, based on a result of detection by the loading machine detection device, the vessel is configured to move in the lateral direction by the slide mechanism such that a position of the vessel is adjusted with respect to the loading machine.

7. The transport machine according to claim 1,
wherein the slide mechanism is configured to reciprocate the vessel with respect to the lateral direction.

8. The transport machine according to claim 7,
wherein the slide mechanism is configured to reciprocate the vessel in one or both of a loading operation period in which a load is loaded on the vessel and a period after the loading operation period.

9. The transport machine according to claim 8,
wherein an amplitude of reciprocation of the vessel is determined based on a result of detection by the load detection device.

10. The transport machine according to claim 8, wherein the load detection device comprises:
a form detection device configured to detect an external form of a load of the vessel; and
a weight detection device configured to detect a weight of the vessel,
wherein whether to reciprocate the vessel is determined based on a result of detection by the form detection device and a result of detection by the weight detection device.

11. The transport machine according to claim 1, wherein the support device includes a side dump mechanism configured to discharge a load of the vessel to the lateral direction intersecting with the traveling direction.

12. The transport machine according to claim 1,
wherein the traveling device includes a front wheel and a rear wheel,
the vehicle body includes a recess arranged between the front wheel and the rear wheel, and
at least a portion of the vessel is arranged at the recess.

13. The transport machine according to claim 12,
wherein the vehicle body includes a front section, at least a portion of the front section being arranged above the front wheel,
the vehicle body includes a rear section, at least a portion of the rear section being arranged above the rear wheel,
the recess is arranged between the front section and the rear section, and
an upper surface of the vessel is arranged below an upper surface of the front section and an upper surface of the rear section.

* * * * *